US012639877B2

(12) United States Patent
Li et al.

(10) Patent No.: US 12,639,877 B2
(45) Date of Patent: May 26, 2026

(54) REFINEMENT OF FACIAL KEYPOINT METADATA GENERATION FOR VIDEO CONFERENCING OR OTHER APPLICATIONS

(71) Applicant: Samsung Electronics Co., Ltd., Suwon-si (KR)

(72) Inventors: Wenbo Li, Santa Clara, CA (US); Yi Wei, Sunnyvale, CA (US); Jing Zhu, Jackson Heights, NY (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 18/057,117

(22) Filed: Nov. 18, 2022

(65) Prior Publication Data

US 2024/0070955 A1     Feb. 29, 2024

Related U.S. Application Data

(60) Provisional application No. 63/400,147, filed on Aug. 23, 2022.

(51) Int. Cl.
  G06T 13/80     (2011.01)
  G06T 7/246     (2017.01)
  (Continued)

(52) U.S. Cl.
  CPC .............. G06T 13/80 (2013.01); G06T 7/246 (2017.01); G06T 7/70 (2017.01); G06V 10/82 (2022.01);
  (Continued)

(58) Field of Classification Search
  CPC .... G06V 10/82; G06V 40/176; G06V 40/171; G06T 13/80; G06T 7/246; G06T 7/70
  See application file for complete search history.

(56) References Cited

U.S. PATENT DOCUMENTS 9,361,723 B2     6/2016   Zhou et al.
11,354,847 B2    6/2022   Li et al.
       (Continued)

FOREIGN PATENT DOCUMENTS

CN     110049351 A  *  7/2019   ........... H04N 21/234
CN     113099161 A     7/2021
       (Continued)

OTHER PUBLICATIONS

International Search Report and Written Opinion of the International Searching Authority dated Oct. 25, 2023 in connection with International Patent Application No. PCT/KR2023/010689, 9 pages.
       (Continued)

*Primary Examiner* — Weiming He

(57)     ABSTRACT

A method includes obtaining a source image of a user and obtaining a driving video in which a face or a head of the user is moving. The method also includes generating metadata identifying animations to be applied to the source image so that the source image mimics at least some movements of the user's face or head in the driving video. The method further includes transmitting the source image and the metadata to an end user device configured to animate the source image based on the metadata. Generating the metadata includes suppressing one or more artifacts associated with one or more objects that temporarily occlude at least a portion of the user's head or body in the driving video or that temporarily appear in the driving video.

20 Claims, 12 Drawing Sheets

600

(51) Int. Cl.
| | |
|---|---|
| *G06T 7/70* | (2017.01) |
| *G06V 10/82* | (2022.01) |
| *G06V 40/16* | (2022.01) |

(52) U.S. Cl.
CPC .......... *G06V 40/171* (2022.01); *G06V 40/176* (2022.01); *G06T 2207/10016* (2013.01); *G06T 2207/30201* (2013.01); *G06V 2201/10* (2022.01)

(56) References Cited

U.S. PATENT DOCUMENTS

| | | | |
|---|---|---|---|
| 11,354,875 | B2 | 6/2022 | Yao et al. |
| 11,356,640 | B2 | 6/2022 | Astarabadi et al. |
| 11,361,507 | B1 | 6/2022 | Iqbal et al. |
| 2015/0015735 | A1* | 1/2015 | Rav-Acha ............ H04N 23/611<br>348/222.1 |
| 2017/0178306 | A1* | 6/2017 | Le Clerc ............ G06V 10/7715 |
| 2019/0180469 | A1 | 6/2019 | Gu et al. |
| 2019/0215482 | A1 | 7/2019 | Sathya et al. |
| 2021/0195142 | A1 | 6/2021 | Mireles et al. |
| 2021/0327404 | A1 | 10/2021 | Savchenkov et al. |
| 2021/0392295 | A1 | 12/2021 | Gronau et al. |
| 2022/0076059 | A1 | 3/2022 | Mahbub et al. |
| 2022/0247973 | A1 | 8/2022 | Astarabadi et al. |
| 2023/0063221 | A1* | 3/2023 | Marks .................. A61B 5/1176 |
| 2023/0419580 | A1* | 12/2023 | Narayan ................ G06T 13/40 |

FOREIGN PATENT DOCUMENTS

| | | |
|---|---|---|
| CN | 113269066 A | 8/2021 |
| CN | 114710640 A | 7/2022 |
| WO | 2021213742 A1 | 10/2021 |

OTHER PUBLICATIONS

Wang et al., "One-Shot Free-View Neural Talking-Head Synthesis for Video Conferencing," arXiv:2011.15126v3 [cs.CV], Apr. 2021, 16 pages.

Wang et al., "One-Shot Free-View Neural Talking-Head Synthesis for Video Conferencing," 2021 IEEE/CVF Conference on Computer Vision and Pattern Recognition, Jun. 2021, 16 pages.

Siarohin et al., "First Order Motion Model for Image Animation," Advances in Neural Information Processing Systems 32, 2019, 20 pages.

Supplementary European Search Report dated Jun. 27, 2025 in connection with European Patent Application No. 23857585.6, 13 pages.

Wang et al., "One-Shot Free-View Neural Talking-Head Synthesis for Video Conferencing," 2021 IEEE/CVF Conference on Computer Vision and Pattern Recognition (CVPR), 2021, 11 pages.

Geng et al., "Warp-guided GANs for single-photo facial animation," ACM Trans. Graph., vol. 37, No. 6, Article 231, Nov. 2018, 12 pages.

Ding et al., "Occlusion-Adaptive Deep Network for Robust Facial Expression Recognition," May 2020, 9 pages.

Luo et al., "Facial expression recognition in video sequence based on LBP feature and GRU," ICVIP 2021, Dec. 2021, 6 pages.

* cited by examiner

REFINEMENT OF FACIAL KEYPOINT METADATA GENERATION FOR VIDEO CONFERENCING OR OTHER APPLICATIONS

CROSS-REFERENCE TO RELATED APPLICATION AND PRIORITY CLAIM

This application claims priority under 35 U.S.C. § 119(e) to U.S. Provisional Patent Application No. 63/400,147 filed on Aug. 23, 2022. This provisional application is hereby incorporated by reference in its entirety.

TECHNICAL FIELD

This disclosure relates generally to video conferencing, image processing, and other systems. More specifically, this disclosure relates to the refinement of facial keypoint metadata generation for video conferencing or other applications.

BACKGROUND

Video conferencing is becoming more and more popular for both commercial and personal use. One issue commonly affecting participants during video conferencing is a lack of adequate bandwidth, meaning a participant's electronic device may not have adequate bandwidth to both (i) transmit outgoing video and audio data associated with the participant and (ii) receive incoming video and audio data associated with one or more other video conferencing participants. As a result, it is common during video conferencing sessions for participants to experience noticeable degradation of displayed video contents and noticeable interruptions in presented audio contents.

SUMMARY

This disclosure relates to the refinement of facial keypoint metadata generation for video conferencing or other applications.

In a first embodiment, a method includes obtaining a source image of a user and obtaining a driving video in which a face or a head of the user is moving. The method also includes generating metadata identifying animations to be applied to the source image so that the source image mimics at least some movements of the user's face or head in the driving video. The method further includes transmitting the source image and the metadata to an end user device configured to animate the source image based on the metadata. Generating the metadata includes suppressing one or more artifacts associated with one or more objects that temporarily occlude at least a portion of the user's head or body in the driving video or that temporarily appear in the driving video.

In a second embodiment, an apparatus includes at least one processing device configured to obtain a source image of a user and obtain a driving video in which a face or a head of the user is moving. The at least one processing device is also configured to generate metadata identifying animations to be applied to the source image so that the source image mimics at least some movements of the user's face or head in the driving video. The at least one processing device is further configured to initiate transmission of the source image and the metadata to an end user device configured to animate the source image based on the metadata. To generate the metadata, the at least one processing device is configured to suppress one or more artifacts associated with one or more objects that temporarily occlude at least a portion of the user's head or body in the driving video or that temporarily appear in the driving video.

In a third embodiment, a non-transitory computer readable medium contains instructions that when executed cause at least one processor to obtain a source image of a user and obtain a driving video in which a face or a head of the user is moving. The non-transitory computer readable medium also contains instructions that when executed cause the at least one processor to generate metadata identifying animations to be applied to the source image so that the source image mimics at least some movements of the user's face or head in the driving video. The non-transitory computer readable medium further contains instructions that when executed cause the at least one processor to initiate transmission of the source image and the metadata to an end user device configured to animate the source image based on the metadata. The instructions that when executed cause the at least one processor to generate the metadata include instructions that when executed cause the at least one processor to suppress one or more artifacts associated with one or more objects that temporarily occlude at least a portion of the user's head or body in the driving video or that temporarily appear in the driving video.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
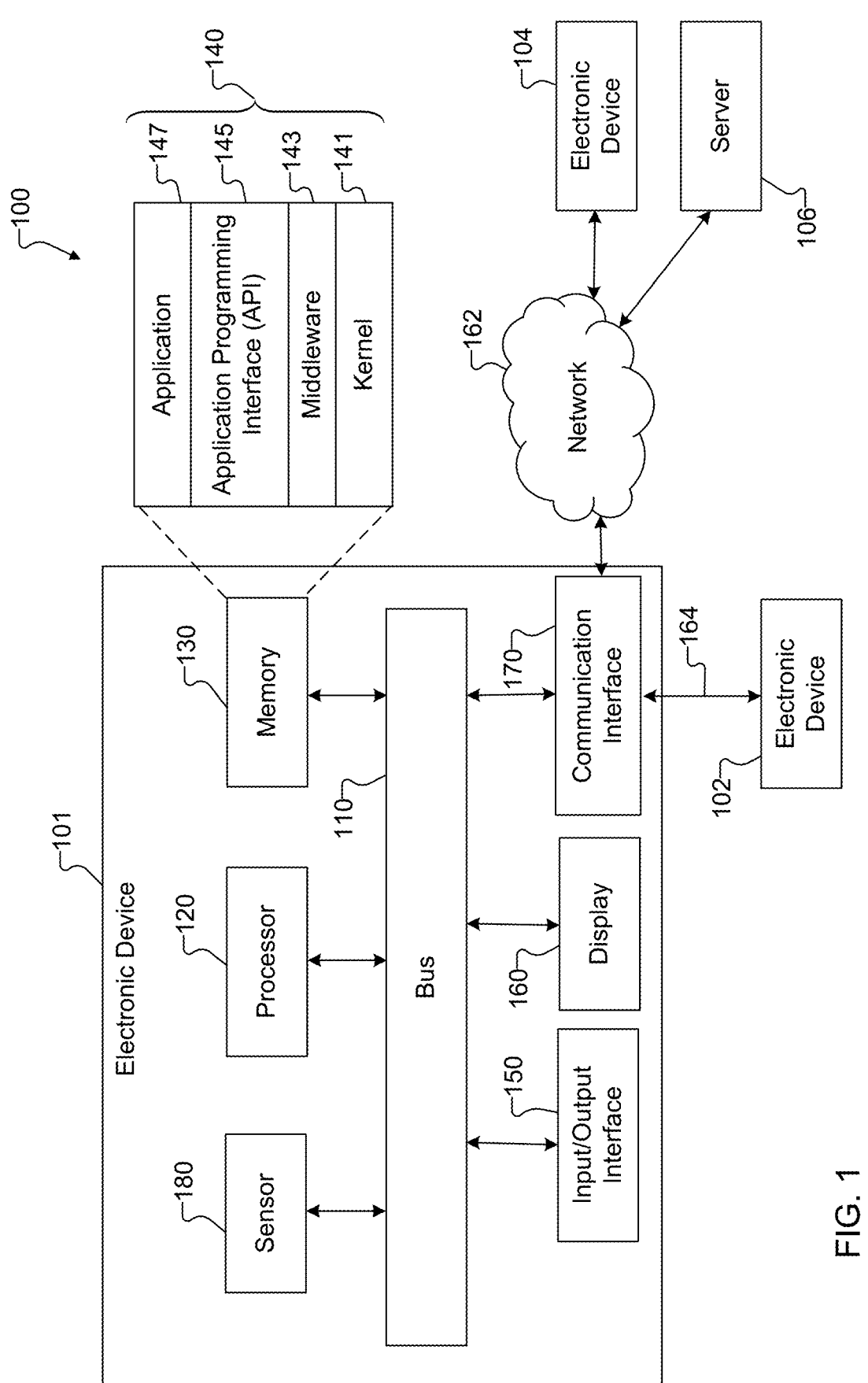
FIG. 1 illustrates an example network configuration including an electronic device in accordance with this disclosure.

FIGS. 1 through 13, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, video conferencing is becoming more and more popular for both commercial and personal use. One issue commonly affecting participants during video conferencing is a lack of adequate bandwidth, meaning a participant's electronic device may not have adequate bandwidth to both (i) transmit outgoing video and audio data associated with the participant and (ii) receive incoming video and audio data associated with one or more other video conferencing participants. As a result, it is common during video conferencing sessions for participants to experience noticeable degradation of displayed video contents and noticeable interruptions in presented audio contents.

In order to reduce the amount of data transmitted to or from participants in a video conferencing session, it is possible to identify, for at least one participant, (i) an image of the participant's face and body and (ii) sequences of facial keypoints extracted from image frames in a video stream for that participant. The facial keypoints identify how the participant's face changes in the image frames of the video stream for that participant. This allows other participants' devices to display the image of the participant's face and body and then change the displayed image of the participant's face and body based on the sequences of facial keypoints.

Unfortunately, video conferencing participants may routinely have portions of their heads or bodies temporarily occluded or blocked, such as when the video conferencing participants make motions or gestures with their hands or arms that temporarily occlude their heads or bodies. It is also common for objects to appear near a participant's face or head or otherwise appear within a video stream for that participant, such as when the participant motions or gestures with his or her hands or arms or when another person approaches the participant. When facial keypoints are identified independently for different image frames of a video stream, this can lead to the creation of visible artifacts when the facial keypoints are subsequently used. This is because the presence of the participants' hands or arms, other people, or other objects can be incorrectly identified as facial keypoints, and reconstructing video streams using these incorrectly-identified facial keypoints can create rendering artifacts or other artifacts.

This disclosure provides techniques for refining facial keypoint metadata generation for video conferencing applications or other applications. As described in more detail below, a source image of a user and a driving video showing movements of the user's face or head can be obtained. In some cases, the source image of the user may represent a source image of a video conferencing participant, and the driving video may represent a video stream of the video conferencing participant. Metadata is generated that identifies animations to be applied to the source image so that the source image mimics at least some of the movements of the user's face or head in the driving video. For example, the metadata may identify rotations and translations to be applied to the user's head in the source image or expression deformations to be applied to the user's face in the source image. The metadata can be generated for different image frames in the driving video in order to identify sequences of rotations and translations or expression deformations to be applied to the user's face or head in the source image. The metadata is transmitted to at least one other device, such as at least one other video conferencing participant's device, which can be configured to animate the source image based on the metadata.

During the generation of the metadata, one or more artifacts associated with one or more objects that temporarily occlude at least a portion of the user's head or body or that temporarily appear in the driving video can be suppressed. For instance, a trained machine learning model may be used to process metadata (such as the metadata related to the rotations and translations or expression deformations of the user in the driving video) and generate refined metadata, where the trained machine learning model is trained to suppress effects of one or more objects that temporarily occlude at least a portion of the user's head or body or that temporarily appear in the driving video. This can help to reduce or prevent the creation of artifacts caused by temporary occlusions of the user's head or body or artifacts caused by temporary objects being present. In some cases, refinement of the metadata may also cause finer details of the user's face or head movements to be suppressed, such as when lip movements of the user's face are suppressed. To help overcome this issue, a merging mechanism can be used to merge at least some of the refined metadata with the original (raw) metadata related to the user's expression deformations. This can help to at least partially restore the finer details of the user's face or head movements.

In this way, metadata related to facial keypoints or other aspects of a user's face can be identified in a driving video and used during video conferencing or other applications, which can significantly reduce bandwidths required for video conferencing participants. Also, the metadata can be refined so that any metadata related to non-facial keypoints of the user is suppressed, such as when one or more hands or arms of the user might temporarily occlude at least a portion of the user's head or body or appear near the user's face or head or when a person or other object(s) appear(s) near the user in the driving video. This helps to reduce noise in the metadata associated with the facial keypoints and to reduce or eliminate the creation of rendering artifacts when a source image is animated based on the refined metadata. Further, the merging mechanism can help to ensure that finer details of the user's face or head movements remain in the metadata, which can result in improved video reconstruction results. In addition, various additional functionalities may be supported here, such as functions for maintaining an animated source image looking forward even if the user turns his or her head or for using an artificial image (such as a "beautified selfie") as the source image.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to process image/video data in order to perform refined facial keypoint metadata generation for video conferencing or other applications. The processor 120 may also or alternatively be used to obtain a source image and metadata and to animate the source image based on the metadata in order to support video conferencing or other applications.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for processing image/video data in order to perform refined facial keypoint metadata generation and/or for obtaining a source image and metadata and animating the source image based on the metadata in order to support video conferencing or other applications. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (LR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). Each network 162 or 164 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to process image/video data in order to perform refined facial keypoint metadata generation for video conferencing or other applications. The server 106 may also or alternatively be used to provide a source image and metadata to one or more end user devices (such as the electronic device 101) for use in animating the source image based on the metadata in order to support video conferencing or other applications.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
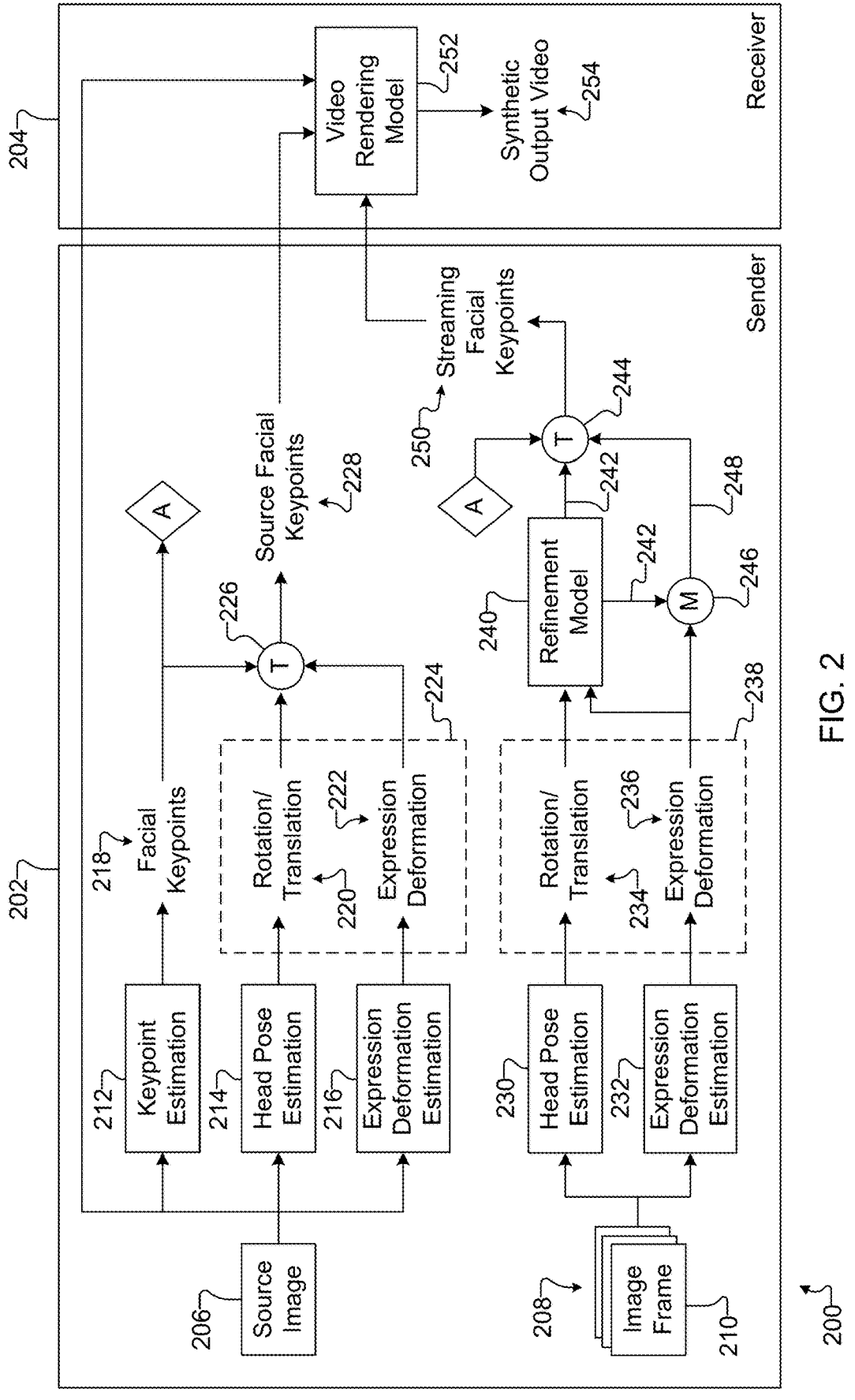
FIG. 2 illustrates an example architecture for refined facial keypoint metadata generation for video conferencing or other applications in accordance with this disclosure.

FIG. 2 illustrates an example architecture 200 for refined facial keypoint metadata generation for video conferencing or other applications in accordance with this disclosure. For ease of explanation, the architecture 200 shown in FIG. 2 is described as being implemented on or supported by one or more electronic devices in the network configuration 100 of FIG. 1. However, the architecture 200 shown in FIG. 2 could be used with any other suitable device(s) and in any other suitable system(s).

As shown in FIG. 2, the architecture 200 generally involves the use of a sending device 202 and a receiving device 204. The sending device 202 represents an electronic device used by a user to provide video data (and optionally other data like audio data), which is provided directly or indirectly to the receiving device 204. Each of the sending device 202 and the receiving device 204 may represent any suitable electronic device, such as an electronic device 101 of FIG. 1. Note that while the device 202 is referred to as the "sending" device and the device 204 is referred to as the "receiving" device, this is in reference only to one particular communication direction that is shown in FIG. 2. In many cases, the devices 202 and 204 may include similar components, so each device 202 or 204 may be able to transmit information to and receive information from the other device 204 or 202. Also, note that while two devices 202 and 204 are shown here, there may be more than two devices used in a video conferencing application or other application. As a result, the sending device 202 may send information to any suitable number of receiving devices, and the receiving device 204 may receive information from any suitable number of sending devices.

In this example, the sending device 202 obtains a source image 206 and a driving video 208 containing multiple image frames 210. The source image 206 represents an image associated with a user of the sending device 202. In some cases, the source image 206 may represent an actual image of the user of the sending device 202. For example, the source image 206 may be captured using the sending device 202, such as when the sending device 202 includes one or more imaging sensors 180. The source image 206 may represent a current image, a recent image, or an older image of the user of the sending device 202. In other cases, the source image 206 may represent an artificial image of the user of the sending device 202. For instance, the artificial image may represent an actual image of the user that has undergone one or more image processing operations to alter the appearance of the user, such as when the artificial image represents a "beautified selfie" of the user. In general, the source image 206 may include any suitable image of or representing the user of the sending device 202.

The driving video 208 represents a series of image frames 210 capturing the user of the sending device 202, such as image frames 210 capturing the user speaking or listening during a video conference. The driving video 208 typically captures all or a majority of the face and head of the user of the sending device 202, often along with a portion of the user's body (such as the user's shoulders and upper torso). The driving video 208 also captures movements of the user, such as movements of the user's face or head. This can include movements that reposition or rotate the user's head within image frames 210 and expression deformations in which the user's face deforms when speaking or when making expressions (like emotional expressions on the user's face). In some cases, the driving video 208 may represent images of the user captured using the sending device 202, such as when the sending device 202 includes one or more imaging sensors 180. In general, the driving video 208 may include any suitable video of or representing the user of the sending device 202. The driving video 208 may include any suitable number of image frames 210, which can vary based on (among other things) the framerate of the video capture.

The source image 206 is provided to a facial keypoint estimation function 212, a head pose estimation function 214, and an expression deformation estimation function 216. The facial keypoint estimation function 212 generally operates to process the source image 206 and identify facial keypoints 218 associated with the user's face in the source image 206. The facial keypoints 218 are said to represent "canonical" keypoints and identify specific positions of various features associated with the user's face. The numbers and positions of the facial keypoints 218 that are identified here can vary depending on the implementation and the source image 206. In some cases, the facial keypoints 218 can identify the positions of various features associated with the user's face, such as positions of the eyes, nose, mouth, cheeks, chin, forehead, and neck of the user (or any combination thereof). The facial keypoint estimation function 212 can use any suitable image processing technique or other technique to identify specific features of the user's face in the source image 206, such as by performing object identification or object recognition to identify the specific features of the user's face and the locations of the specific features within the source image 206.

The head pose estimation function 214 generally operates to process the source image 206 and estimate rotation and translation parameters 220 associated with the user's face or head within the source image 206. The translation of the user's face or head within the source image 206 may be defined by the position of the user's head side-to-side and up-and-down within the source image 206. For example, the user's face or head may be perfectly centered in the source image 206 or may be positioned to the left or right and/or above or below the center point of the source image 206. In some cases, the translation of the user's face or head within the source image 206 may be expressed as a translational deformation of the user's face or head within the source image 206. The rotation of the user's face or head within the source image 206 may be defined by the direction that the user's face or head is pointing within the source image 206. For instance, the user's face or head may be pointing directly forward in the source image 206, or the user may have rotated his or her head about one or more axes within the source image 206. In some cases, the rotation of the user's face or head within the source image 206 may be expressed using pitch, yaw, and roll angles of the user's face or head within the source image 206. The head pose estimation function 214 can use any suitable image processing technique or other technique to identify the translation and rotation of the user's face or head in the source image 206, such as by using a head orientation detection algorithm.

The expression deformation estimation function 216 generally operates to process the source image 206 and estimate one or more expression deformations 222 associated with the user's face within the source image 206. Expression deformations may be defined as deformations or changes in the shape of the user's face or positions of features of the user's face as the user is speaking or showing emotions. For example, the shape of the user's face and positions of various features of the user's face can change depending on whether the user is smiling, frowning, shocked/surprised, scared, and so on. The expression deformation estimation function 216 can therefore identify one or more expression deformations 222 contained in the source image 206, where the expression deformation(s) 222 can define the expression of the user as contained in the source image 206. The expression deformation estimation function 216 can use any suitable image processing technique or other technique to identify the expression deformation(s) of the user's face in the source image 206, such as by using a pattern recognition technique.

Collectively, the rotation and translation parameters 220 and the expression deformations 222 determined for the source image 206 represent a set of metadata 224. The set of metadata 224 effectively describes the pose of the user's head and the expression deformation of the user's face as contained in the source image 206. The facial keypoints 218 and the set of metadata 224 are provided to a transformation function 226, which transforms the facial keypoints 218 based on the rotation and translation parameters 220 and the expression deformations 222. This converts the canonical facial keypoints 218 into source facial keypoints 228. The source facial keypoints 228 can represent the facial keypoints of the user's face or head in the source image 206 in the absence of any translation/rotation and in the absence of specific emotional expressions. The transformation function 226 can use any suitable technique to transform canonical facial keypoints 218 based on rotation and translation parameters 220 and expression deformations 222, such as a three-dimensional (3D) projection or other 3D transformation.

The driving video 208 is provided to a head pose estimation function 230 and an expression deformation estimation function 232. The head pose estimation function 230 can operate in the same or similar manner as the head pose estimation function 214 described above, and the expression deformation estimation function 232 can operate in the same or similar manner as the expression deformation estimation function 216 described above. In fact, in some cases, the head pose estimation function 214 and the head pose estimation function 230 may represent the same function, such as when head pose estimation is performed for the source image 206 and subsequently performed for the driving video 208 using the same function. Similarly, in some cases, the expression deformation estimation function 216 and the expression deformation estimation function 232 may represent the same function, such as when expression deformation estimation is performed for the source image 206 and subsequently performed for the driving video 208 using the same function. Here, however, the head pose estimation function 230 and the expression deformation estimation function 232 may process multiple images, namely the multiple image frames 210 contained in the driving video 208. Thus, the head pose estimation function 230 can be used to generate rotation and translation parameters 234 associated with the user's face or head within each image frame 210, and the expression deformation estimation function 232 can be used to estimate one or more expression deformations 236 associated with the user's face within each image frame 210. Collectively, the rotation and translation parameters 234 and the expression deformations 236 determined for each image frame 210 represent a set of metadata 238, and there can be a set of metadata 238 for each image frame 210 contained in the driving video 208.

In this example, the sets of metadata 238 are provided to a refinement model 240. The refinement model 240 can represent one or more trained machine learning models that have been trained to refine one or more subsequent sets of metadata 238 based on one or more previous sets of metadata 238. For example, one or more initial sets of metadata 238 can contain metadata associated with only the user's face or head within one or more initial image frames 210. However, if at some point the user moves his or her hand(s) or arm(s) into one or more subsequent image frames 210, this could lead to the creation of rendering artifacts or other artifacts unless corrected. Similar issues can arise when other objects appear in the subsequent image frames 210 or occlude portions of the user's head or body. The refinement model 240 provides the correction here by refining the one or more subsequent sets of metadata 238 for the one or more subsequent image frames 210 containing the interfering object(s). For instance, the refinement model 240 can adjust the metadata in one or more subsequent sets of metadata 238 based on one or more previous sets of metadata 238 for image frames 210 that do not contain the object(s), such as the one or more prior sets of metadata 238 associated with one or more image frames 210 immediately preceding the image frame(s) 210 containing the interfering object(s). The refinement model 240 here is effectively trained to take temporal information in the form of noisy sets of metadata 238 and reduce or eliminate the noise in the metadata 238.

As a particular example of this functionality, a user captured in the driving video 208 may touch his or her face with his or her hand in one or more image frames 210. The presence of the user's hand(s) in those image frames 210 can cause the resulting sets of metadata 238 for those image frames 210 to be noisy. Without correction, this noise can lead to the creation of rendering artifacts or other artifacts. However, the refinement model 240 here refines the set(s) of metadata 238 for the one or more image frames 210 containing the user's hand(s), such as by using one or more sets of metadata 238 from one or more preceding image frames 210 that do not capture the user's hand(s).

The refinement model 240 can use any suitable technique to refine sets of metadata 238 associated with image frames 210 of a driving video 208. For example, as noted above, the refinement model 240 may represent one or more trained machine learning models, and each trained machine learning model may use any number of machine learning model architectures. As an example, in some embodiments, the refinement model 240 may include one or more recurrent neural networks. In particular embodiments, the refinement model 240 may include multiple recurrent neural networks, such as a recurrent neural network trained to receive raw pitch, yaw, and roll angles and output refined pitch, yaw, and roll angles; a second recurrent neural network trained to receive raw translation deformations and output refined translation deformations; and a third recurrent neural network trained to receive raw expression deformations and output refined expression deformations. In even more particular embodiments, each recurrent neural network may be implemented using a gated recurrent unit (GRU)-based recurrent neural network. However, the refinement model 240 may be implemented in any other suitable manner.

As shown in FIG. 2, the refinement model 240 outputs sets of refined metadata 242, such as a set of refined metadata 242 for each image frame 210. Depending on the contents of the image frames 210, each set of refined metadata 242 may match the associated original set of metadata 238 (such as when no occluding objects or other interfering objects are in the corresponding image frame 210) or include modified metadata based on the associated original set of metadata 238 (such as when at least one occluding object or other interfering object is in the corresponding image frame 210).

When the refinement model 240 is implemented using one or more machine learning models, the one or more machine learning models can be trained in any suitable manner. For example, in some cases, training data and ground truth data can be obtained. The training data may include driving videos that include objects occluding portions of users' heads or bodies or otherwise appearing in the driving videos, and the ground truth data may include correct metadata to be generated using the training data. The training data can be provided to the head pose estimation function 230 and the expression deformation estimation function 232 in order to produce rotation and translation parameters 234 and expression deformations 236. The rotation and translation parameters 234 and expression deformations 236 can be provided to one or more machine learning models as sets of metadata 238, and the one or more machine learning models can be used to generate sets of refined metadata 242 associated with the original sets of metadata 238. The sets of refined metadata 242 can be compared to the ground truth data, and differences or errors between the sets of refined metadata 242 and the ground truth data can be identified and used to calculate an overall error or loss for the one or more machine learning models. If the calculated loss exceeds a threshold, parameters of the one or more machine learning models can be adjusted, and the metadata 238 can be processed again (or new metadata 238 for different training data can be processed) using the updated machine learning model(s) in order to produce new sets of refined metadata 242 that can be compared to ground truth data in order to calculate an updated loss. Ideally, the calculated loss decreases over time and eventually falls below the threshold, indicating that the one or more machine learning models have been trained to accurately (at least to within the desired accuracy represented by the threshold) generate sets of refined metadata 242 even in the presence of objects occluding portions of users' heads or bodies or appearing in driving videos. One specific example technique for training one specific example type of machine learning model is described below with respect to FIGS. 3 through 5.

As shown in FIG. 2, the sets of refined metadata 242 and the facial keypoints 218 are provided to a transformation function 244, which can operate in the same or similar manner as the transformation function 226 described above. In some cases, the transformation function 226 and the transformation function 244 may represent the same function, such as when the facial keypoints 218 are transformed using the metadata 224 associated with the source image 206 and subsequently are transformed using the metadata 238 associated with the driving video 208.

Because the refinement model 240 can adjust the metadata 238, it is possible for the architecture 200 to be robust against occluding objects or other objects that can interfere with the effective identification of metadata 238 related to facial keypoints. However, in some instances, the operation of the refinement model 240 might negatively affect finer details of the user's face or head movements. For example, it is possible for lip movements of the user to be suppressed in the sets of refined metadata 242. To help compensate for this or other similar issues, a merging function 246 is used to merge or combine the original (raw) expression deformations 236 with at least some of the refined metadata 242 to produce merged metadata 248. For instance, the merging function 246 may replace some of the expression deformation information contained in one or more sets of refined metadata 242 with some of the information contained in the original expression deformations 236. As a particular example, expression deformation information related to facial keypoints at or around the user's mouth in one or more sets of refined metadata 242 could be replaced by expression deformation information related to the same facial keypoints in the original expression deformations 236. This allows the merged metadata 248 to retain information related to finer movements of the user's face.

The transformation function 244 here can use refined rotation/translation information in the sets of refined metadata 242 and the expression deformation information contained in the merged metadata 248 to transform the facial keypoints 218. The expression deformation information contained in the merged metadata 248 can include both (i) refined expression deformation information in the sets of refined metadata 242 and (ii) expression deformation information in the original expression deformations 236. The transformation function 244 generally operates to convert the canonical facial keypoints 218 into multiple sets of streaming facial keypoints 250, such as one set of streaming facial keypoints 250 for each image frame 210. Each set of streaming facial keypoints 250 can represent the facial keypoints of the user's face or head in one of the image frames 210.

The source image 206, the source facial keypoints 228, and the sets of streaming facial keypoints 250 are transmitted to the receiving device 204, either directly or indirectly (such as via the server 106). In some embodiments, the source image 206 and the source facial keypoints 228 may only be transmitted once from the sending device 202 to the receiving device 204, such as prior to or at the start of a video conferencing session. As discussed above, the source image 206 may be captured, generated, or otherwise obtained immediately before the video conferencing session, or the source image 206 may be captured, generated, or otherwise obtained some time prior to the video conferencing session (as possibly long before the video conferencing session). The sets of streaming facial keypoints 250 can be transmitted from the sending device 202 to the receiving device 204 as the video conferencing session proceeds.

In this example, the receiving device 204 implements or otherwise has access to a video rendering model 252. The video rendering model 252 can receive the source image 206, the source facial keypoints 228, and the sets of streaming facial keypoints 250 as inputs and generate a synthetic output video 254. The synthetic output video 254 can include animations applied to the source image 206 so that the source image 206 mimics at least some of the movements of the user's face or head in the driving video 208. As a result, the receiving device 204 is able to produce the synthetic output video 254 so that the synthetic output video 254 appears to be an actual video from the sending device 202 (at least to some desired degree of accuracy) without requiring or using the bandwidth to receive the entire driving video 208.

In some embodiments, the video rendering model 252 may represent one or more trained machine learning models that have been trained to produce synthetic output videos based on source images, source facial keypoints, and the sets of streaming facial keypoints. When implemented using machine learning, the one or more trained machine learning models may be trained in a similar manner as discussed above. Here, the training data may include training source images, training source facial keypoints, and training sets of streaming facial keypoints, and the ground truth data can include known synthetic output videos to be produced by the machine learning model(s). Note, however, that the receiving device 204 may use the source image 206, the source facial keypoints 228, and the sets of streaming facial keypoints 250 in any other suitable manner to produce the synthetic output video 254.

It should be noted that the functions shown in or described with respect to FIG. 2 can be implemented in an electronic device 101, server 106, or other device(s) in any suitable manner. For example, in some embodiments, at least some of the functions shown in or described with respect to FIG. 2 can be implemented or supported using one or more software applications or other software instructions that are executed by the processor 120 of the electronic device 101, server 106, or other device(s). In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions. Also, since the sending device 202 may also receive data (such as another source image, other source facial keypoints, and other sets of streaming facial keypoints) from the receiving device 204, the sending device 202 may include a video rendering model 252, and the receiving device 204 may include the various components of the sending device 202.

Although FIG. 2 illustrates one example of an architecture 200 for refined facial keypoint metadata generation for video conferencing or other applications, various changes may be made to FIG. 2. For example, various components and functions in FIG. 2 may be combined, further subdivided, replicated, or rearranged according to particular needs. Also, one or more additional components and functions may be included if needed or desired. Further, the architecture 200 represents one example environment where the refinement of facial keypoint metadata generation for video conferencing or other applications can be used. However, this functionality may be used in any other suitable environment.

In addition, the above description has often assumed that the sending device 202 is one user's electronic device (such as one instance of the electronic device 101) and that the receiving device 204 is another user's electronic device (such as another instance of the electronic device 101). In these embodiments, each instance of the electronic device 101 may represent any suitable end-user electronic device, such as a smartphone, tablet computer, laptop computer, desktop computer, smart glasses, extended reality (XR) headset (including a virtual reality, augmented reality, or mixed reality headset), or any other suitable electronic device (including those described above). However, the sending device 202 and the receiving device 204 may each represent any other suitable device or system, including non-end-user devices. For instance, the sending device 202 may represent a server (such as the server 106) that receives a source image 206 and a driving video 208 from one electronic device 101 or other device and provides the source image 206, the source facial keypoints 228, and the sets of streaming facial keypoints 250 to another electronic device 101 or other device. In general, this disclosure is not limited to any specific physical implementation of the sending device 202 or the receiving device 204.

Figure 3:
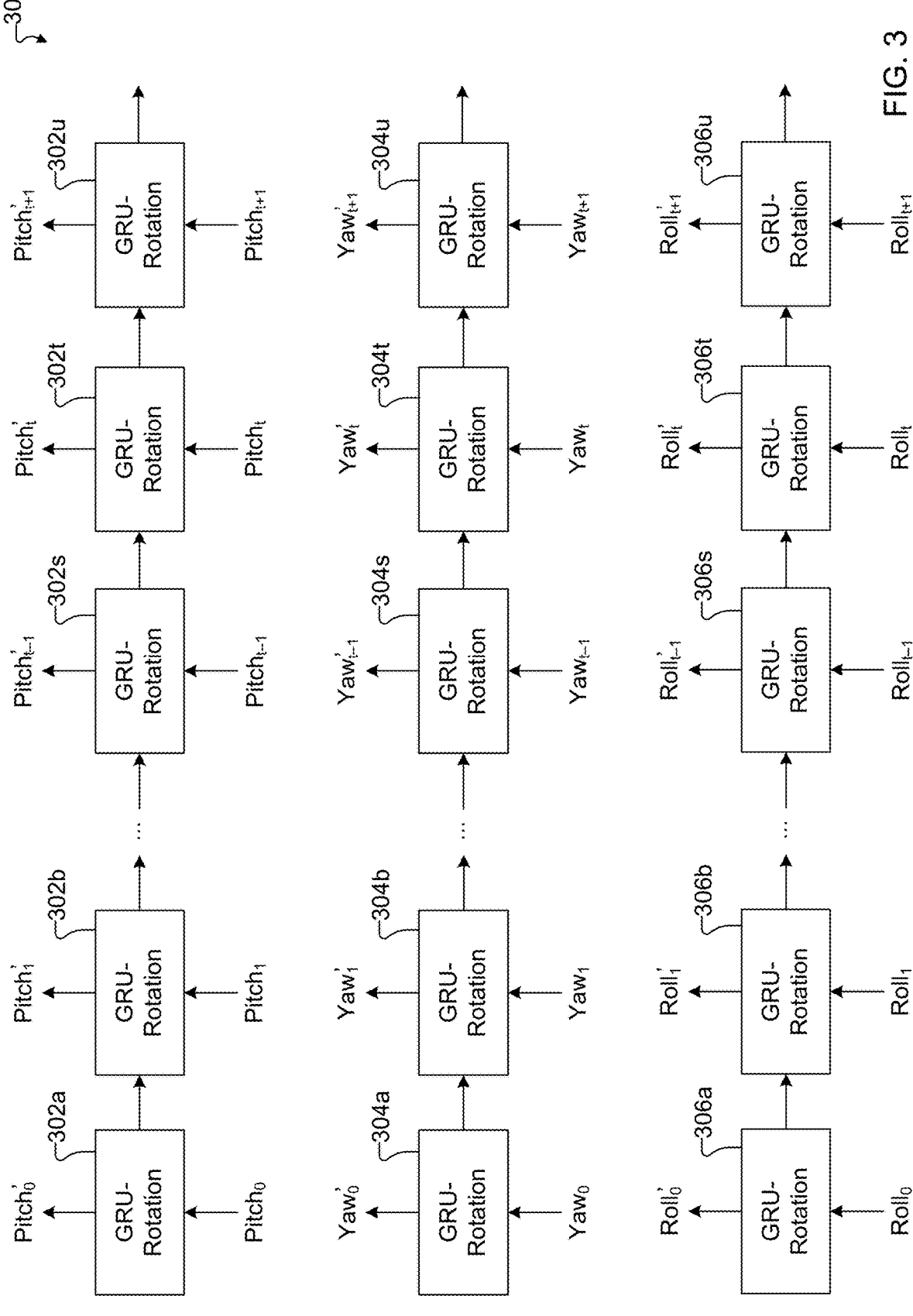
FIGS. 3 through 5 illustrate example machine learning models that may be used in the architecture of FIG. 2 in accordance with this disclosure.
Figure 4:
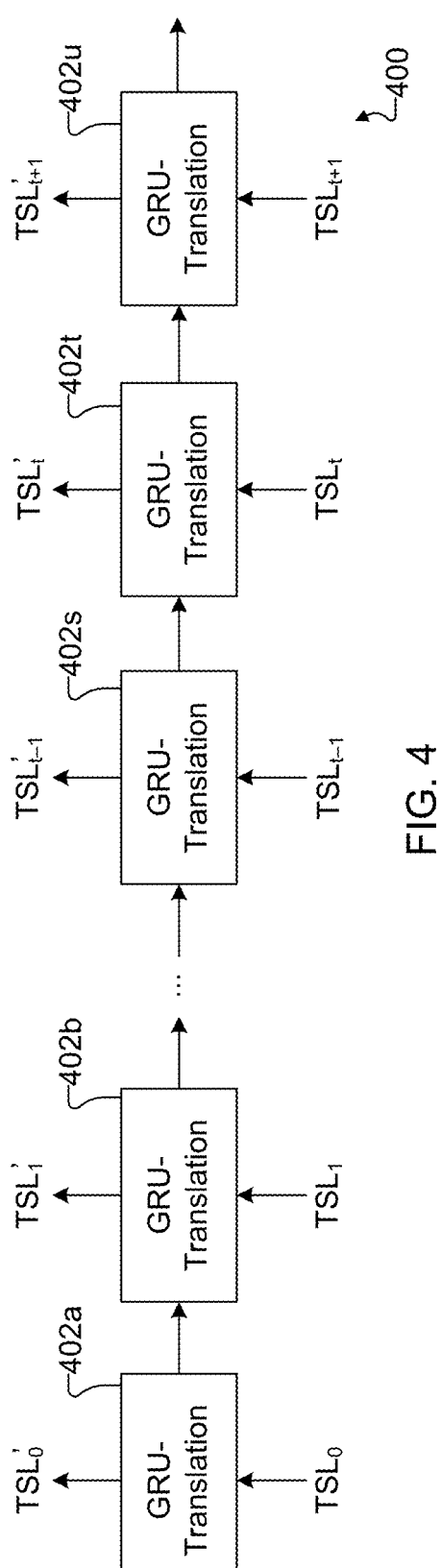
Figure 5:
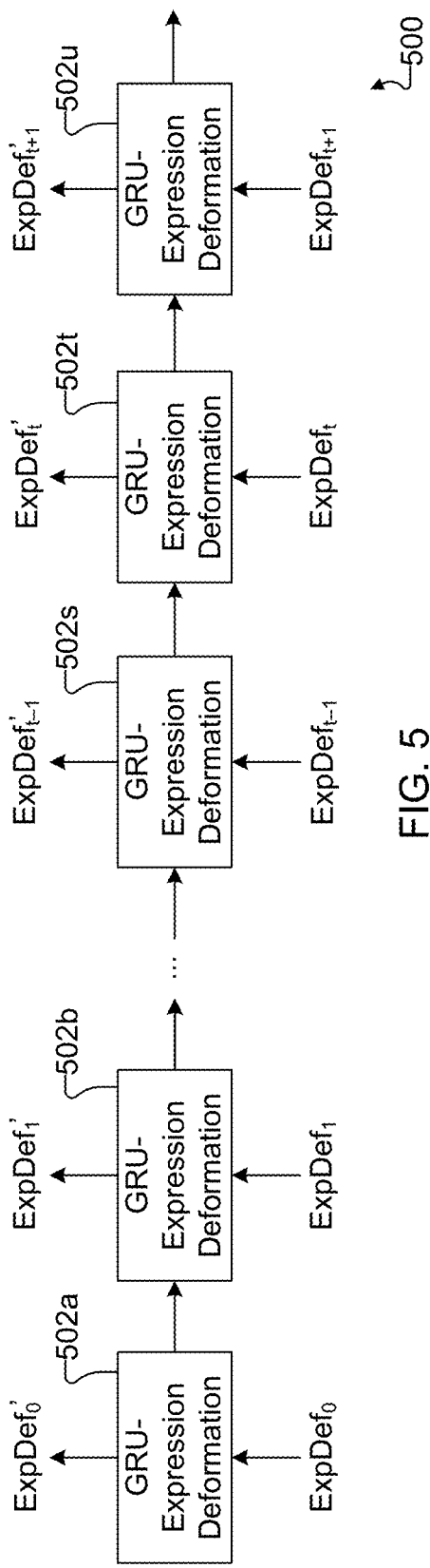

FIGS. 3 through 5 illustrate example machine learning models 300, 400, 500 that may be used in the architecture 200 of FIG. 2 in accordance with this disclosure. More specifically, FIGS. 3 through 5 illustrate specific examples of how various functions of the refinement model 240 in the architecture 200 of FIG. 2 may be implemented. Note, however, that the refinement model 240 in the architecture 200 of FIG. 2 may be implemented in any other suitable manner.

As shown in FIG. 3, a machine learning model 300 is provided for identifying how to refine rotations identified by the head pose estimation function 230. In this example, it is assumed that the head pose estimation function 230 outputs three angles for each image frame 210, namely a pitch angle, a yaw angle, and a roll angle. The pitch angle identifies an angle (if any) that the user has rolled his or her head up or down, where this rotation may be viewed as occurring about an axis extending side-to-side through the user's head. The yaw angle identifies an angle (if any) that the user has rolled his or her head left or right, where this rotation may be viewed as occurring about an axis extending top-to-bottom through the user's head. The roll angle identifies an angle (if any) that the user has rolled his or her head clockwise or counterclockwise, where this rotation may be viewed as occurring about an axis extending front-to-back through the user's head. In FIG. 3, the original (raw) rotation angles from the head pose estimation function 230 produced over time for the image frames 210 are denoted $Pitch_0$ through $Pitch_{t+1}$, $Yaw_0$ through $Yaw_{t+1}$, and $Roll_0$ through $Roll_{t+1}$. The subscripts here can be associated with different image frames 210 received by the sending device 202.

The machine learning model 300 here uses one or more GRU-based recurrent neural networks. For example, rotational GRU gates $302a$-$302u$ can be used to process the pitch angles $Pitch_0$ through $Pitch_{t+1}$, rotational GRU gates $304a$-$304u$ can be used to process the yaw angles $Yaw_0$ through $Yaw_{t+1}$, and rotational GRU gates $306a$-$306u$ can be used to process the roll angles $Roll_0$ through $Roll_{t+1}$ over time. In some cases, the same set of GRU gates may be used to process the pitch, yaw, and roll angles. In other cases, different sets of GRU gates may be used to process the pitch, yaw, and roll angles. In each set of GRU gates, the GRU gates can process the input angles and produce refined output angles. For instance, the set(s) of GRU gates can produce refined pitch angles $Pitch_0'$ through $Pitch_{t+1}'$, refined yaw angles $Yaw_0'$ through $Yaw_{t+1}'$, and refined roll angles $Roll_0'$ through $Roll_{t+1}'$. Each set of GRU gates can also pass information from one GRU gate to the next GRU gate along the set, where the information passed between the GRU gates is typically referred to as the hidden states of the recurrent neural network. In this type of configuration, if an occlusion or nearby object interferes with the correct determination of the rotation aspect of the user's head pose at a specific time step or steps (for one or more image frames 210), information from one or more previous time steps (for one or more previous image frames 210) can be used to correct the noisy rotations in the subsequent time step(s). Ideally, the refined angles output by the machine learning model 300 can accurately reflect the rotational motion of the user's head by removing the effects of an occluding or nearby object.

As shown in FIG. 4, a machine learning model 400 is provided for identifying how to refine translations identified by the head pose estimation function 230. The machine learning model 400 has a similar structure as the machine learning model 300 and includes translational GRU gates $402a$-$402u$. In this example, it is assumed that the head pose estimation function 230 outputs translation (TSL) values over time for the image frames 210, where the translation values identify distances or other translational deformations based on movement of the user's face or head from a specified position (such as a center pixel) within the image frames 210. In FIG. 4, the original (raw) translation values from the head pose estimation function 230 produced over time for the image frames 210 are denoted $TSL_0$ through $TSL_{t+1}$. Again, the subscripts here can be associated with different image frames 210 received by the sending device 202.

The translational GRU gates $402a$-$402u$ can be used to process the translation values over time. In the set of GRU gates $402a$-$402u$, the GRU gates can process the translation values $TSL_0$ through $TSL_{t+1}$ and produce refined translation values $TSL_0'$ through $TSL_{t+1}'$. The set of gates $402a$-$402u$ can also pass information from one GRU gate to the next GRU gate along the set. In this type of configuration, if an occlusion or nearby object interferes with the correct determination of the translation aspect of the user's head pose at a specific time step or steps, information from one or more previous time steps can be used to correct the noisy translations in the subsequent time step(s). Ideally, the refined translations output by the machine learning model 400 can accurately reflect the translational motion of the user's head by removing the effects of an occluding or nearby object.

As shown in FIG. 5, a machine learning model 500 is provided for identifying how to refine expression deformations identified by the expression deformation estimation function 232. The machine learning model 500 has a similar structure as the machine learning models 300, 400 and includes expression deformation GRU gates $502a$-$502u$. In this example, it is assumed that the expression deformation estimation function 232 outputs expression deformation (ExpDef) values over time for the image frames 210, where the expression deformation values identify different expressions or types of deformations in the user's face within the image frames 210. In FIG. 5, the original (raw) expression deformations from the expression deformation estimation function 232 produced over time for the image frames 210 are denoted $ExpDef_0$ through $ExpDef_{t+1}$. Again, the subscripts here can be associated with different image frames 210 received by the sending device 202.

The expression deformation GRU gates $502a$-$502u$ can be used to process the expression deformations over time. In the set of GRU gates $502a$-$502u$, the GRU gates can process the expression deformations $\text{ExpDef}_0$ through $\text{ExpDef}_{t+1}$ and produce refined expression deformations $\text{ExpDef}_0'$ through $\text{ExpDef}_{t+1}'$. The set of gates $502a$-$502u$ can also pass information from one GRU gate to the next GRU gate along the set. In this type of configuration, if an occlusion or nearby object interferes with the correct determination of the expression deformation of the user's face at a specific time step or steps, information from one or more previous time steps can be used to correct the noisy expression deformations in the subsequent time step(s). Ideally, the refined expression deformations output by the machine learning model 500 can accurately reflect the expression deformations of the user's face by removing the effects of an occluding or nearby object.

In some embodiments, each of the GRU-based machine learning models 300, 400, 500 can be trained using training data (such as noisy rotation angles, noisy translations, or noisy expression deformations) and ground truth data (such as desired "de-noised" rotation angles, translations, or expression deformations). The machine learning models 300, 400, 500 can be trained by minimizing loss functions between the ground truth data and the refined rotation angles, refined translations, and refined expression deformations produced by the machine learning models 300, 400, 500. In particular embodiments, each loss function includes an adversarial loss term and a reconstruction loss term.

Although FIGS. 3 through 5 illustrate examples of machine learning models 300, 400, 500 that may be used in the architecture 200 of FIG. 2, various changes may be made to FIGS. 3 through 5. For example, each of the machine learning models 300, 400, 500 may include any suitable number of GRU gates. Also, the refinement model 240 may be implemented using any other suitable machine learning model architecture or architectures and is not limited to the use of GRU-based recurrent neural networks.

Figure 6:
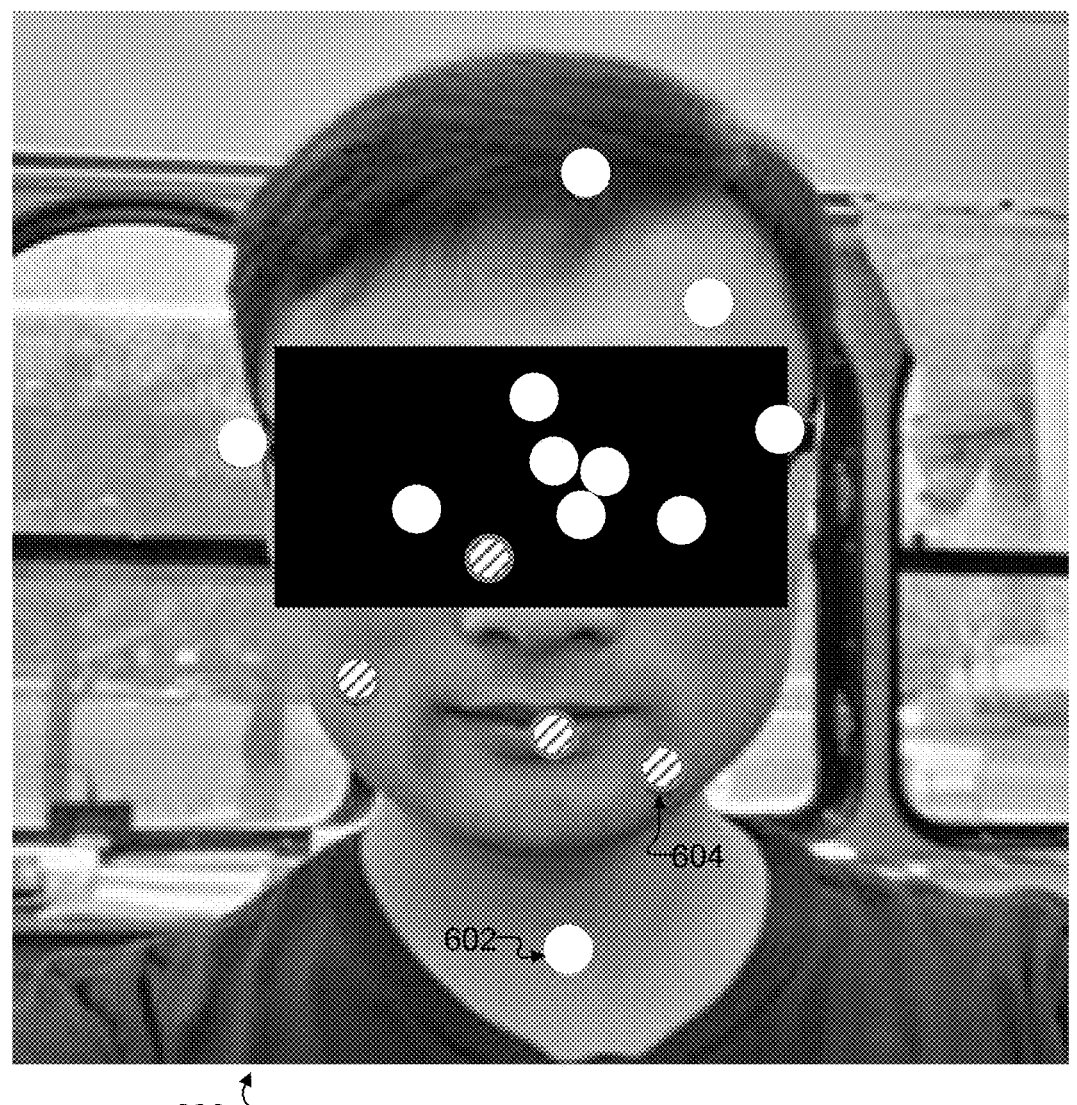
FIG. 6 illustrates an example merging of facial keypoint metadata in the architecture of FIG. 2 in accordance with this disclosure.

FIG. 6 illustrates an example merging of facial keypoint metadata in the architecture 200 of FIG. 2 in accordance with this disclosure. More specifically, FIG. 6 illustrates a specific example of how the merging function 246 can be used to merge or combine original expression deformations 236 with refined metadata 242 to produce merged metadata 248. Note, however, that the merging function 246 in the architecture 200 of FIG. 2 may be implemented in any other suitable manner.

As shown in FIG. 6, an image frame 600 captures a scene including a user, whose face is partially obscured here for privacy. The user's face can be associated with a number of facial keypoints 602 and 604. The expression deformation estimation function 232 can produce expression deformations (the ExpDef values described above) for the facial keypoints 602 and 604 in each image frame 210, and the refinement model 240 can output refined expression deformations (the ExpDef values described above) for the facial keypoints 602 and 604 in each image frame 210. Many of the facial keypoints (namely the facial keypoints 602 shown here) are located in positions where movement of the user's lips may have little if any impact on the user's face at those positions.

Others of the facial keypoints (namely the facial keypoints 604 shown here) are located in positions where movement of the user's lips may have a much larger impact on the user's face at those positions. These facial keypoints 604 may represent the primary or only facial keypoints that are used by the video rendering model 252 to animate the user's lips as contained in the source image 608 when producing the synthetic output video 254. The refined expression deformations for the facial keypoints 604 as produced by the refinement model 240 may be less accurate due to the operations of the refinement model 240. As a result, the merging function 246 may replace the refined expression deformations for the facial keypoints 604 as produced by the refinement model 240 with the original expression deformations for those facial keypoints 604 as produced by the expression deformation estimation function 232. This can help to restore the finer movements of the user's lips in one or more of the sets of streaming facial keypoints 250, which can result in more accurate rendering of the user's face in the synthetic output video 254.

Although FIG. 6 illustrates one example of the merging of facial keypoint metadata in the architecture 200 of FIG. 2, various changes may be made to FIG. 6. For example, the number of facial keypoints 602, the number of facial keypoints 604, and the positions of the facial keypoints 602 and 604 can vary as needed or desired depending on the implementation and on the image(s) being processed.

FIGS. 7 through 11 illustrate example results that may be obtained using refined facial keypoint metadata generation for video conferencing or other applications in accordance with this disclosure. More specifically, FIGS. 7 through 11 illustrate example results that may be obtained using the architecture 200 of FIG. 2. Note, however, that the architecture 200 may be used in any other suitable manner.

Figure 7:
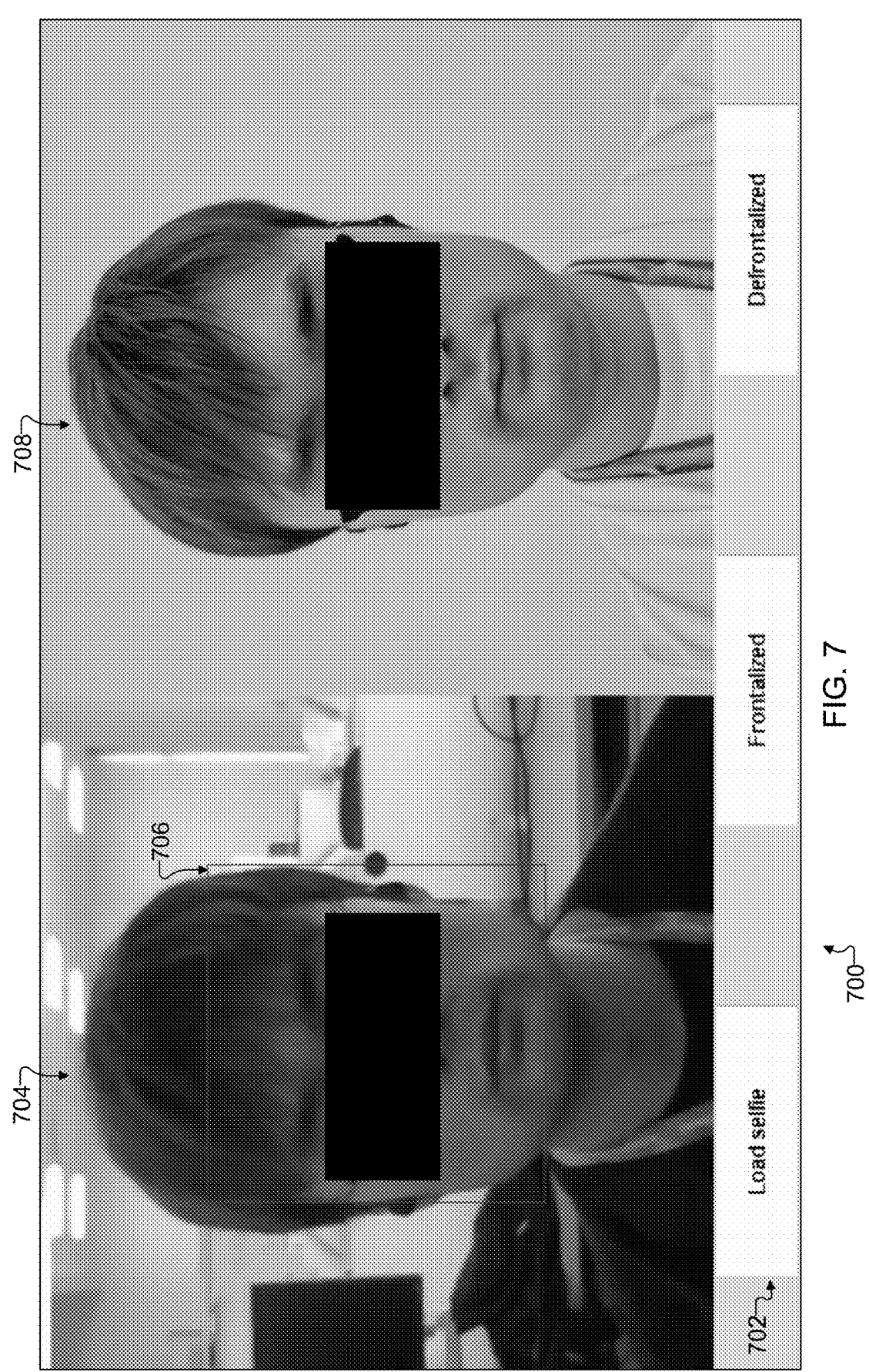
FIGS. 7 through 11 illustrate example results that may be obtained using refined facial keypoint metadata generation for video conferencing or other applications in accordance with this disclosure.

As shown in FIG. 7, a graphical user interface 700 can be presented to a user, such as a user of the sending device 202. Here, the graphical user interface 700 includes controls 702 that allow the user to take or load a selfie of the user, which may be used as the source image 206. The controls 702 also allow the user to select a "frontalized" or "defrontalized" operation, both of which are described below. The graphical user interface 700 also includes a user display area 704, which contains live video of the user. During a video conference or other use, for instance, the user display area 704 may present the driving video 208 captured of the user. For the user's convenience, a marker 706 may optionally be presented in the user display area 704 to identify an area where the user should attempt to place his or her face during the video conference or other use. This example of the user display area 704 contains an actual face of a user, where the user's face is partially obscured here for privacy.

The graphical user interface 700 further includes a synthetic user display area 708, which contains a synthetic image or a synthetic video of the user. For example, the synthetic user display area 708 could present a single image representing how the user would appear (in static fashion) within the synthetic output video 254 generated by another device. The synthetic user display area 708 could also or alternatively present the synthetic output video 254 that would be generated by another device. This example of the synthetic user display area 708 again contains a synthetic face of the user, where the synthetic user's face is partially obscured here for privacy.

Note that while the graphical user interface 700 includes both display areas 704 and 708, this is for convenience of illustration and explanation only. In other embodiments, the sending device 202 may include a graphical user interface 700 that only presents the user display area 704 or that presents the user display area 704 and optionally presents the synthetic user display area 708. The receiving device 202 may include a graphical user interface that presents the synthetic user display area 708 without presenting the user display area 704, since the receiving device 202 may not receive an actual driving video 208.

Figure 8:
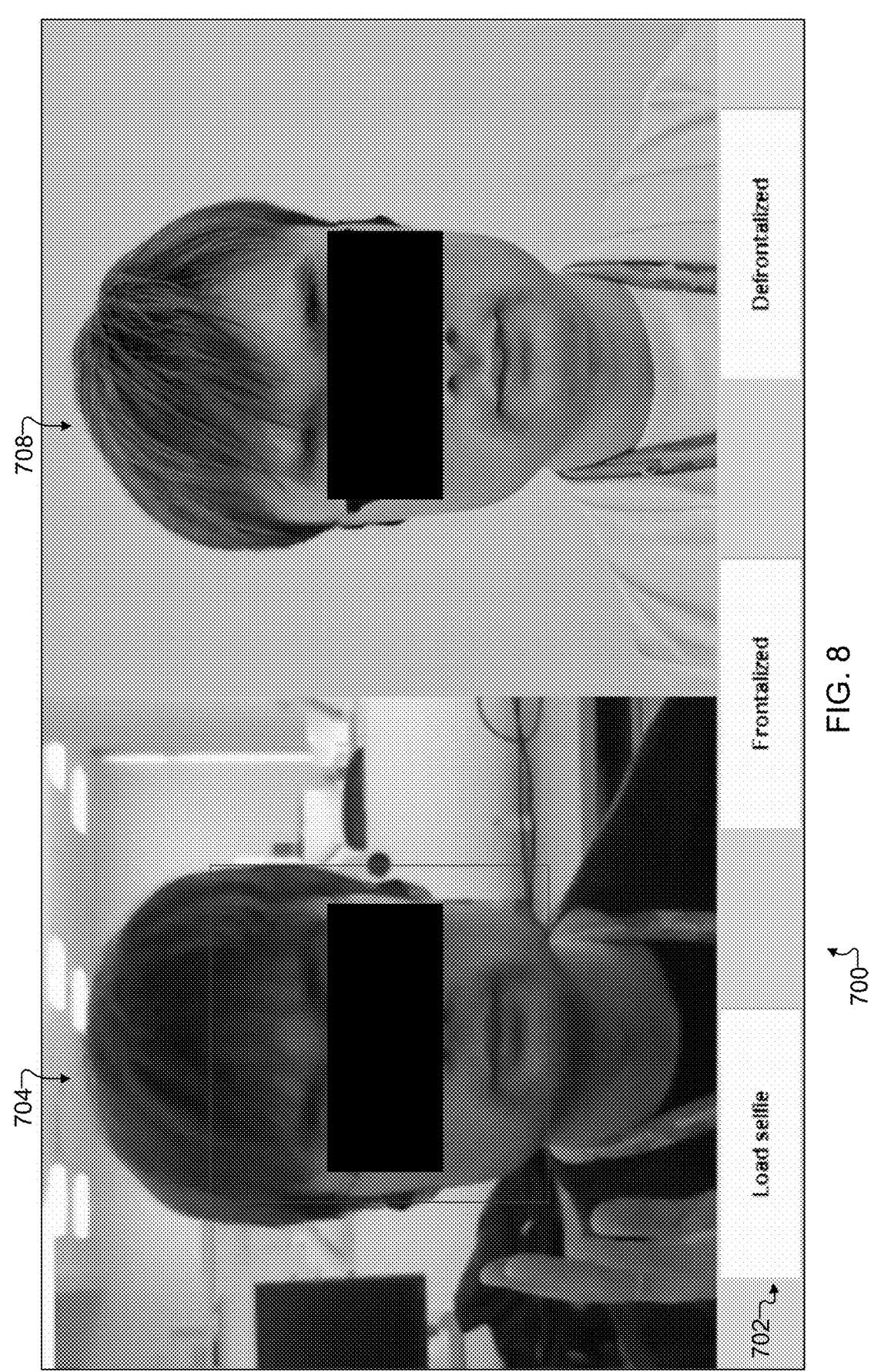

One example of the artifact suppression capabilities of the architecture 200 is illustrated in FIG. 8, where the user has raised his hand near his face in the driving video 208. Here, the architecture 200 is able to sense the object and suppress the metadata associated with the object. As a result, one or more other users may not see the user's hand, since the metadata is corrected to remove metadata associated with the user's hand from one or more sets of refined metadata 242. As a result, the corresponding portion of the synthetic output video 254 shown in FIG. 8 may lack the user's hand and contain few or no artifacts associated with the location of the user's hand.

Figure 9:
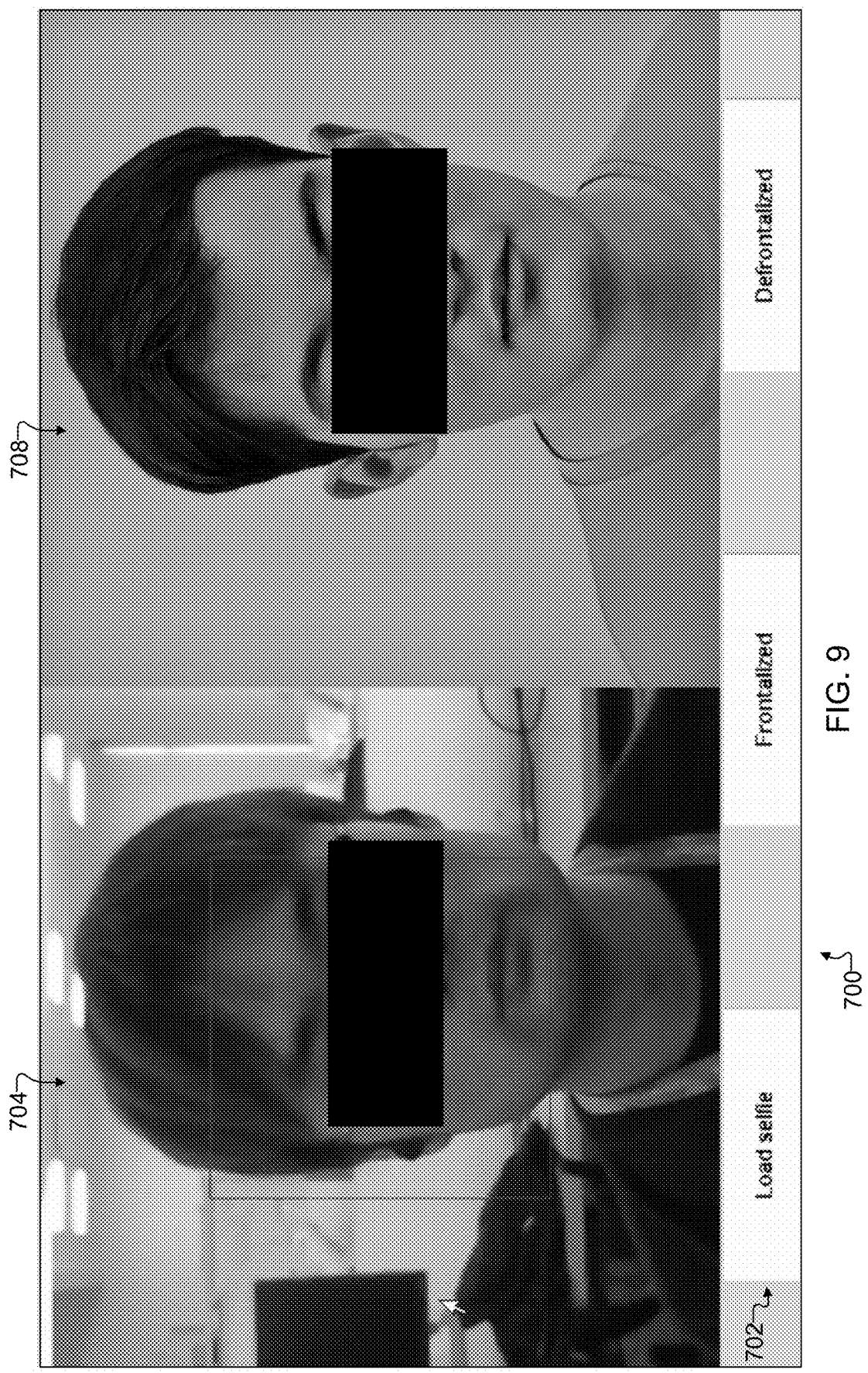

In the example shown in FIGS. 7 and 8, the synthetic face looks very much like the user's actual face, which can occur when the user uses an actual picture of the user as the source image 206. However, this is not required. For example, as shown in FIG. 9, the synthetic user display area 708 here shows an artificially-generated face associated with the user. In some cases, the artificially-generated face may represent a so-called "beautified selfie," which may represent an image of the user that has been modified in some way and used as the source image 206.

Figure 10:
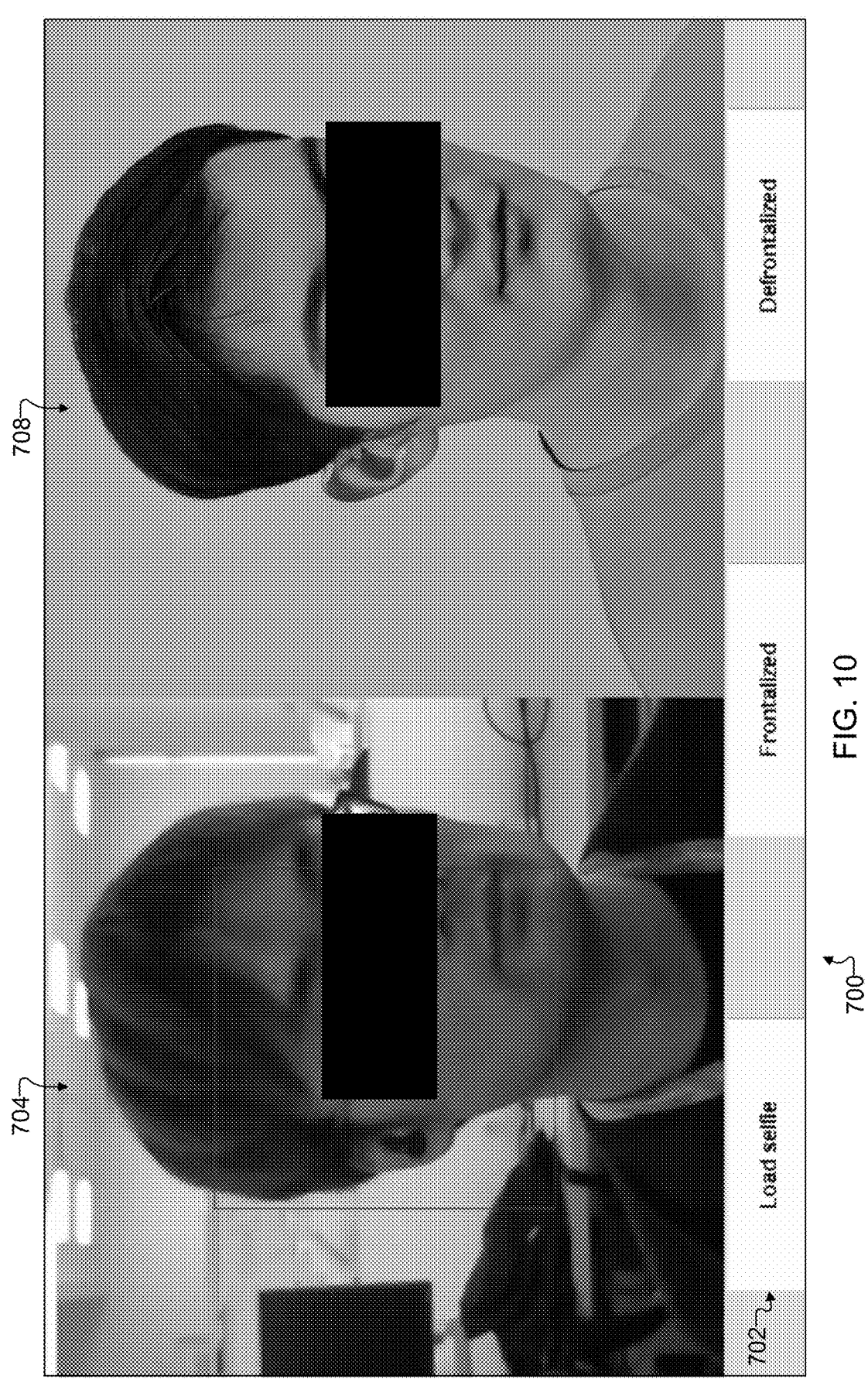

Regardless of the type of image used as the source image 206, a "frontalized" operation or "defrontalized" operation may be performed. The "defrontalized" operation refers to an operation of the architecture 200 where the image of the user as contained in the synthetic output video 254 generally follows the real-world user's actual head movements. An example of this is shown in FIG. 10, where the user has actually turned his head to the left and the image of the user as contained in the synthetic output video 254 also turns to the left. The user here may make any suitable movements, and the head pose estimation function 230 can generally be used to track the user's head movements so as to allow the source image 206 of the user as contained in the synthetic output video 254 to mimic the user's head movements. The source image 206 of the user as contained in the synthetic output video 254 would also be animated so that the user's facial expressions and lip movements mimic the user's actual facial expressions and lip movements.

Figure 11:
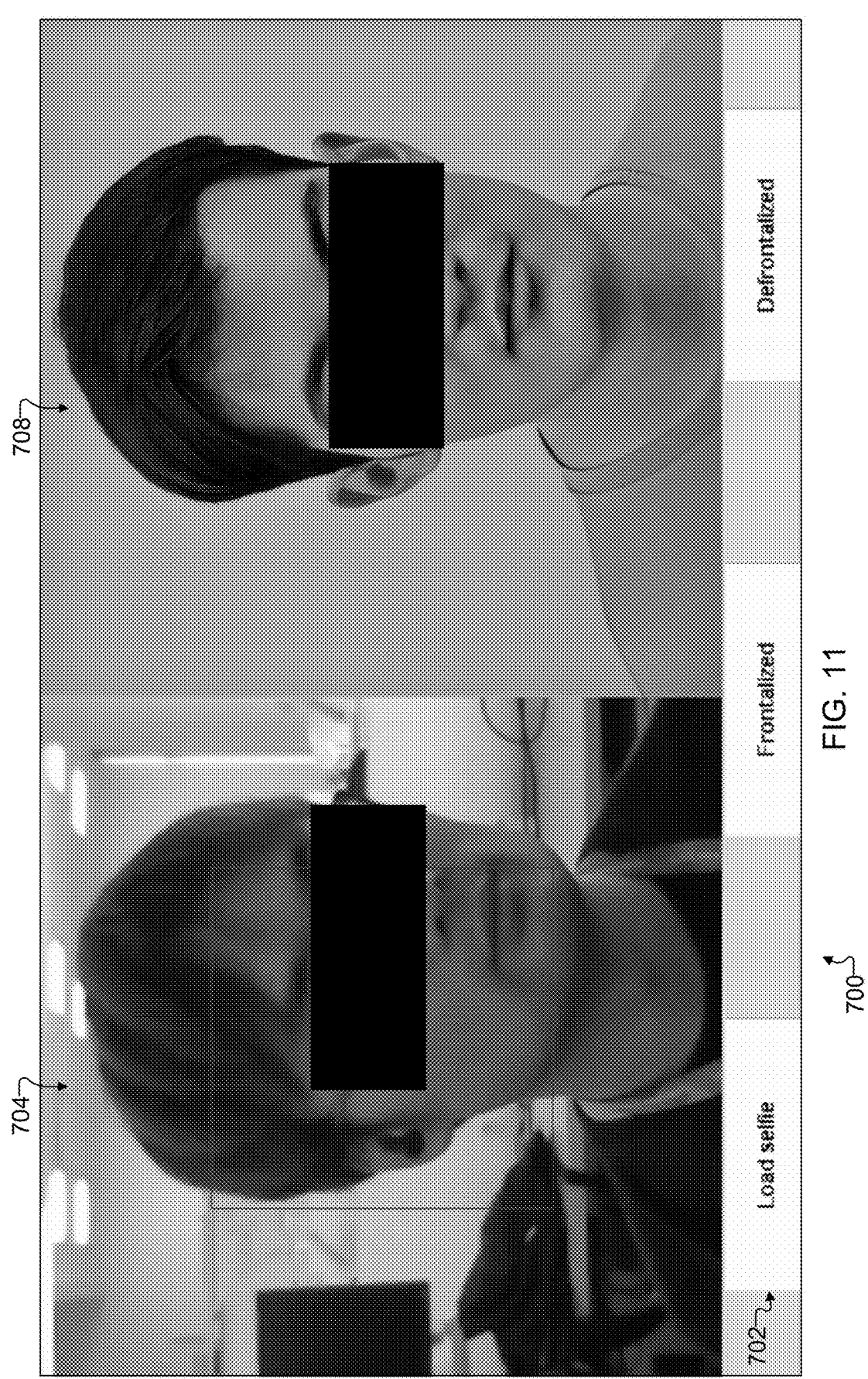

In contrast, the "frontalized" operation refers to an operation of the architecture 200 where the image of the user as contained in the synthetic output video 254 generally faces forward regardless of the user's actual head movements. An example of this is shown in FIG. 11, where the user has actually turned his head to the left but the image of the user as contained in the synthetic output video 254 remains facing forward. This mode can be achieved by deactivating the head pose estimation function 230 or suppressing the rotation (and possibly the translation) outputs from the head pose estimation function 230. This can cause the video rendering model 252 to generally keep the user's face forward during the video conference or other use. However, the source image 206 of the user as contained in the synthetic output video 254 can still be animated so that the user's facial expressions and lip movements mimic the user's actual facial expressions and lip movements.

Although FIGS. 7 through 11 illustrate example results that may be obtained using refined facial keypoint metadata generation for video conferencing or other applications, various changes may be made to FIGS. 7 through 11. For example, the graphical user interface 700 may have any other suitable form and include any desired contents. Also, the option to use the "frontalized" or "defrontalized" operation is not required, and the architecture 200 may support one mode of operation but not the other.

Figure 12:
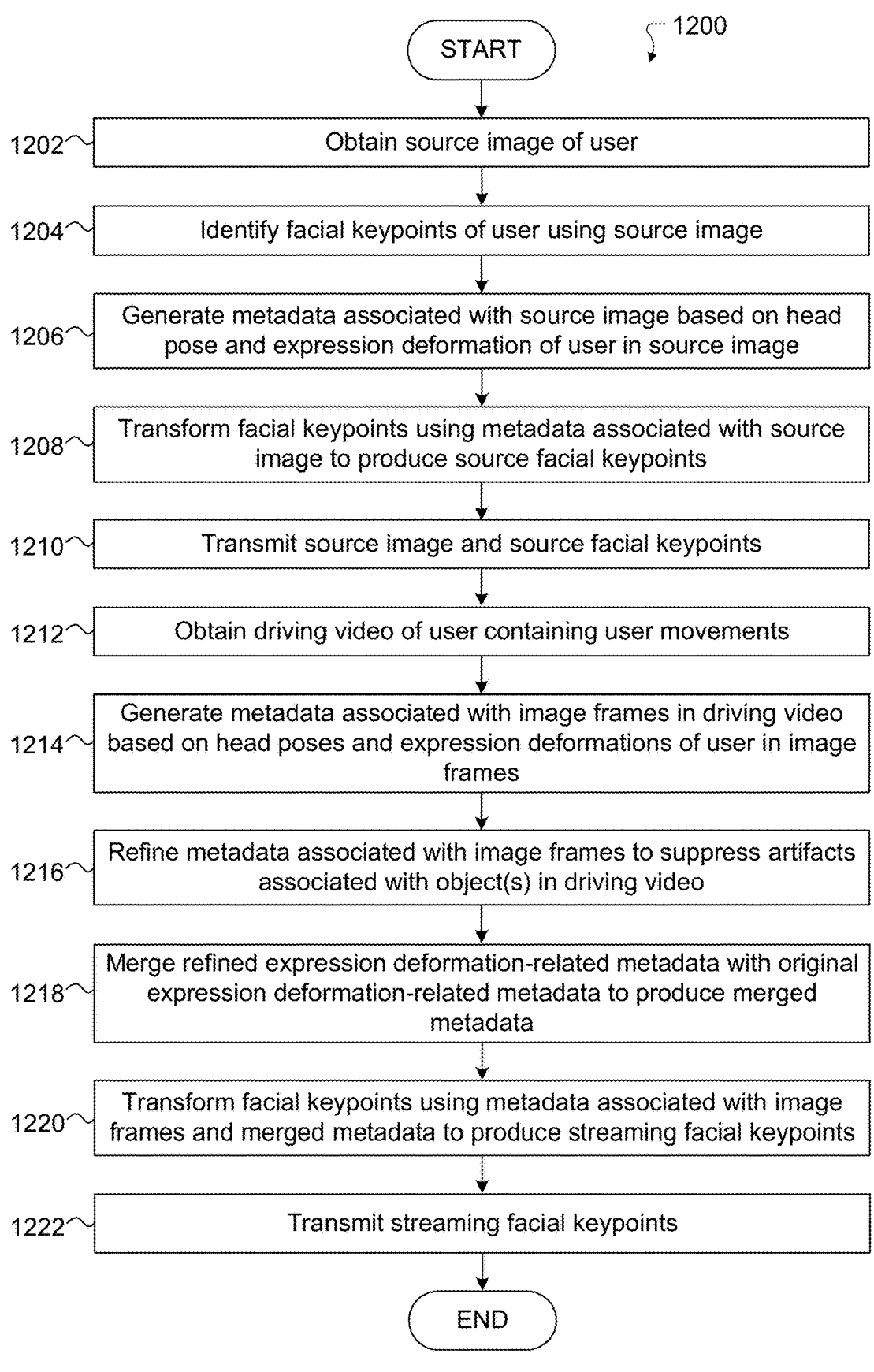
FIGS. 12 and 13 illustrate example methods for refined facial keypoint metadata generation and use in accordance with this disclosure.
Figure 13:
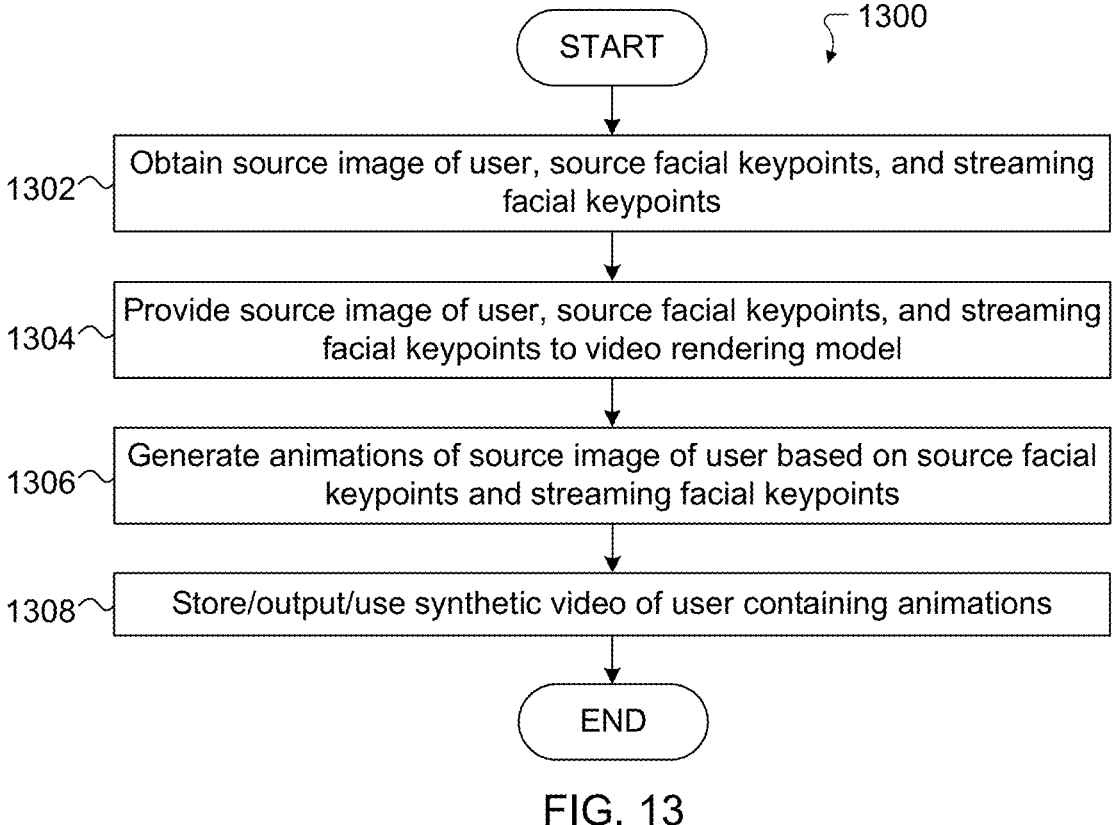

FIGS. 12 and 13 illustrate example methods 1200 and 1300 for refined facial keypoint metadata generation and use in accordance with this disclosure. For example, the method 1200 may be used by a sending device 202, and the method 1300 may be used by a receiving device 204. For ease of explanation, each method 1200 and 1300 is described as being performed using the sending device 202 or the receiving device 204 as implemented using the electronic device 101 of FIG. 1. However, each method 1200 and 1300 may be performed using any other suitable device(s) and in any other suitable system(s). For instance, the method 1200 may be at least partially performed using the server 106 of FIG. 1.

As shown in FIG. 12, a source image of a user is obtained at step 1202. This may include, for example, the processor 120 of the electronic device 101 capturing, receiving, or otherwise obtaining the source image 206 of the user. As noted above, the source image 206 may be a current, recent, or older image of the user of the electronic device 101 or a beautified selfie or other artificial image of or associated with the user (which may or may not be generated by the electronic device 101). Facial keypoints of the user are identified using the source image at step 1204. This may include, for example, the processor 120 of the electronic device 101 performing the facial keypoint estimation function 212 to identify canonical facial keypoints 218 associated with the eyes, nose, mouth, cheeks, chin, forehead, and neck (or any combination thereof) of the user.

Metadata associated with the source image is identified based on the head pose and expression deformation of the user in the source image at step 1206. This may include, for example, the processor 120 of the electronic device 101 performing the head pose estimation function 214 to identify rotation and translation parameters 220 associated with the user's head in the source image 206. This may also include the processor 120 of the electronic device 101 performing the expression deformation estimation function 216 to estimate one or more expression deformations 222 associated with the user's face in the source image 206.

The facial keypoints are transformed using the metadata associated with the source image at step 1208. This may include, for example, the processor 120 of the electronic device 101 performing the transformation function 226 to transform the facial keypoints 218 using the metadata 224 that includes the rotation and translation parameters 220 and expression deformations 222 to produce source facial keypoints 228. The source image and the source facial keypoints are transmitted at step 1210. This may include, for example, the processor 120 of the electronic device 101 transmitting the source image 206 and the source facial keypoints 228 to another electronic device, either directly or indirectly (such as via a server 106).

A driving video of the user is obtained at step 1212. This may include, for example, the processor 120 of the electronic device 101 capturing, receiving, or otherwise obtaining the driving video 208 containing a number of image frames 210. The user's face and head generally move in the driving video 208, such as due to the user talking, making expressions or gestures, or otherwise moving. Metadata associated with each image frame in the driving video is identified based on the head pose and expression deformation of the user in the image frame at step 1214. This may include, for example, the processor 120 of the electronic device 101 performing the head pose estimation function 230 to identify rotation and translation parameters 234 associated with the user's head in each image frame 210. This may also include the processor 120 of the electronic device 101 performing the expression deformation estimation function 232 to estimate expression deformations 236 associated with the user's face in each image frame 210.

The metadata associated with one or more of the image frames is refined to suppress one or more artifacts associated with one or more objects in the one or more image frames at step 1216. This may include, for example, the processor 120 of the electronic device 101 providing the sets of metadata 238 to the refinement model 240, which can identify noisy metadata associated with one or more image frames 210 and refine the noisy metadata based on metadata associated with one or more earlier image frames 210. The refinement model 240 can generate sets of refined metadata 242, which can include refined rotation and translation parameters and refined expression deformations. The refined expression deformation-related metadata is merged with the original expression deformation-related metadata for at least one of the image frames at step 1218. This may include, for example, the processor 120 of the electronic device 101 performing the merging function 246 to replace refined expression deformation-related metadata (as generated by the refinement model 240) with original expression deformation-related metadata (as generated by the expression deformation estimation function 232) for one or more facial keypoints, such as one or more facial keypoints on, near, or otherwise associated with or affected by movement of the user's lips.

The facial keypoints are transformed using the metadata associated with the image frames and the merged metadata at step 1220. This may include, for example, the processor 120 of the electronic device 101 performing the transformation function 244 to transform the facial keypoints 218 using the sets of refined metadata 242 and the merged metadata 248 to produce streaming facial keypoints 250. The streaming facial keypoints are transmitted at step 1222. This may include, for example, the processor 120 of the electronic device 101 transmitting the streaming facial keypoints 250 to the other electronic device, either directly or indirectly (such as via a server 106).

As shown in FIG. 13, a source image of a user, source facial features associated with the user, and streaming facial features associated with the user are obtained at step 1302. This may include, for example, the processor 120 of one electronic device 101 receiving a source image 206, source facial keypoints 228, and streaming facial keypoints 250 from another electronic device 101, a server 106, or other device. In some cases, the source image 206 and the source facial keypoints 228 may be received by the electronic device 101 initially, and the streaming facial keypoints 250 may be received later over time following receipt of the source image 206 and source facial keypoints 228.

The source image, source facial features, and streaming facial features are provided to a video rendering model at step 1304. This may include, for example, the processor 120 of the electronic device 101 providing the source image 206, source facial keypoints 228, and streaming facial keypoints 250 to the video rendering model 252. Again, in some cases, the source image 206 and source facial keypoints 228 may be provided to the video rendering model 252 initially, and the streaming facial keypoints 250 may be provided to the video rendering model 252 over time.

Animations of the source image are generated based on the source facial keypoints and streaming facial keypoints at step 1306. This may include, for example, the processor 120 of the electronic device 101 using the video rendering model

252 to determine how to adjust the source image 206 of the user based on differences between the source facial keypoints 228 and the streaming facial keypoints 250. The determined adjustments to the source image 206 can be identified so as to cause the source image 206 to change in order to mimic at least some of the movements of the user's face or head in the original driving video 208. The result can be a synthetic output video 254 that includes the user from the source image 206 as animated by the video rendering model 252. Note that some or all movements of the user's face or head in the original driving video 208 may be mimicked in the synthetic output video 254. For instance, in the "defrontalized" mode of operation, most or all movements of the user's face or head in the original driving video 208 may be mimicked in the synthetic output video 254. In the "frontalized" mode of operation, movements of the user's face in the original driving video 208 may be mimicked in the synthetic output video 254, but movements of the user's head may not be.

The synthetic output video can be stored, output, or used in some manner at step 1308. This may include, for example, the processor 120 of the electronic device 101 presenting the synthetic output video 254 on an integrated or external display, such as on the display 160. If the synthetic output video 254 relates to a video conference or other use that involves more than two users, the method 1200 may be performed for each participant, and the method 1300 may be repeated or performed in parallel to produce multiple synthetic output videos 254 of multiple participants that are presented to a user of the electronic device 101.

Although FIGS. 12 and 13 illustrate examples of methods 1200 and 1300 for refined facial keypoint metadata generation and use, various changes may be made to FIGS. 12 and 13. For example, while each figure is shown as a series of steps, various steps in each figure may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

obtaining a source image of a user;

obtaining a driving video in which a face or a head of the user is moving;

generating metadata identifying animations to be applied to the source image so that the source image mimics at least some movements of the user's face or head in the driving video, wherein the metadata comprises raw metadata determined from the driving video and refined metadata determined from the raw metadata, and wherein the raw metadata describes expression deformations of the user's face captured by the driving video; and transmitting the source image and the metadata to an end user device configured to animate the source image based on the metadata;

wherein generating the metadata comprises:

generating expression deformations for facial keypoints in each image frame of the driving video using an expression deformation function;

generating refined expression deformations for the facial keypoints using a refinement model based on the expression deformations;

identifying primary facial keypoints from the facial keypoints;

replacing the refined expression deformations related to the primary facial keypoints with the expression deformations generated by the expression deformation function related to the primary facial keypoints using a merge function to produce merged metadata; and suppressing one or more artifacts associated with one or more objects that temporarily occlude at least a portion of the user's head or body in the driving video or that temporarily appear in the driving video, the one or more artifacts suppressed by adjusting one or more subsequent sets of raw metadata associated with the driving video based on one or more previous sets of raw metadata associated with the driving video that do not contain noisy metadata immediately preceding the one or more subsequent sets of raw metadata; and wherein suppressing the one or more artifacts associated with the one or more objects comprises replacing a first portion of the refined metadata describing at least one of the expression deformations of the user's face with a second portion of the raw metadata describing the at least one of the expression deformations of the user's face.

2. The method of claim 1, wherein generating the metadata further comprises:

for each of multiple image frames in the driving video, determining the raw metadata, wherein, for each image frame, the raw metadata describes a pose of the user's head and the expression deformation of the user's face in the image frame, wherein the raw metadata associated with at least one image frame in the driving video includes noise from the one or more objects that temporarily occlude at least the portion of the user's head or body or that temporarily appear in the driving video; and providing the raw metadata to a trained machine learning model to generate the refined metadata, wherein the trained machine learning model is trained to suppress effects of the one or more objects that temporarily occlude at least the portion of the user's head or body or that temporarily appear in the driving video.

3. The method of claim 2, wherein generating the metadata further comprises:

identifying facial keypoints associated with the user's face in the source image; and for each of the multiple image frames in the driving video, transforming the facial keypoints associated with the user's face based on the corresponding refined metadata to produce streaming facial keypoints, the streaming facial keypoints forming part of the metadata.

4. The method of claim 3, wherein transforming the facial keypoints associated with the user's face for each of the multiple image frames in the driving video is based on merged metadata associated with the image frame.

5. The method of claim 3, wherein generating the metadata further comprises:

determining additional metadata describing a pose of the user's head and an expression deformation of the user's face in the source image; and transforming the facial keypoints associated with the user's face based on the additional metadata to produce source facial keypoints, the source facial keypoints forming part of the metadata.

6. The method of claim 2, wherein the trained machine learning model comprises one or more recurrent neural networks.

7. The method of claim 6, wherein the one or more recurrent neural networks comprise at least one of:

a first gated recurrent unit (GRU)-based recurrent neural network trained to receive raw pitch, yaw, and roll angles and output refined pitch, yaw, and roll angles;

a second GRU-based recurrent neural network trained to receive raw translation deformations and output refined translation deformations; and a third GRU-based recurrent neural network trained to receive raw expression deformations and output refined expression deformations.

8. An apparatus comprising:

at least one processing device configured to:

obtain a source image of a user;

obtain a driving video in which a face or a head of the user is moving;

generate metadata identifying animations to be applied to the source image so that the source image mimics at least some movements of the user's face or head in the driving video, wherein the metadata comprises raw metadata determined from the driving video and refined metadata determined from the raw metadata, and wherein the raw metadata describes expression deformations of the user's face captured by the driving video; and initiate transmission of the source image and the metadata to an end user device configured to animate the source image based on the metadata;

wherein, to generate the metadata, the at least one processing device is configured to:

generate expression deformations for facial keypoints in each image frame of the driving video using an expression deformation function;

generate refined expression deformations for the facial keypoints using a refinement model based on the expression deformations;

identify primary facial keypoints from the facial keypoints;

replace the refined expression deformations related to the primary facial keypoints with the expression deformations generated by the expression deformation function related to the primary facial keypoints using a merge function to produce merged metadata; and suppress one or more artifacts associated with one or more objects that temporarily occlude at least a portion of the user's head or body in the driving video or that temporarily appear in the driving video, the at least one processing device configured to suppress the one or more artifacts by adjusting one or more subsequent sets of raw metadata associated with the driving video based on one or more previous sets of raw metadata associated with the driving video that do not contain noisy metadata immediately preceding the one or more subsequent sets of raw metadata; and wherein, to suppress the one or more artifacts associated with the one or more objects, the at least one processing device is configured to replace a first portion of the refined metadata describing at least one of the expression deformations of the user's face with a second portion of the raw metadata describing the at least one of the expression deformations of the user's face.

9. The apparatus of claim 8, wherein:

to generate the metadata, the at least one processing device is further configured, for each of multiple image frames in the driving video, to determine the raw metadata, wherein, for each image frame, the raw metadata describes a pose of the user's head and the expression deformation of the user's face in the image frame, wherein the raw metadata associated with at least one image frame in the driving video includes noise from the one or more objects that temporarily occlude at least the portion of the user's head or body or that temporarily appear in the driving video; and the at least one processing device is configured to provide the raw metadata to a trained machine learning model to generate the refined metadata, wherein the trained machine learning model is trained to suppress effects of the one or more objects that temporarily occlude at least the portion of the user's head or body or that temporarily appear in the driving video.

10. The apparatus of claim 9, wherein, to generate the metadata, the at least one processing device is further configured to:

identify facial keypoints associated with the user's face in the source image; and for each of the multiple image frames in the driving video, transform the facial keypoints associated with the user's face based on the corresponding refined metadata to produce streaming facial keypoints, the streaming facial keypoints forming part of the metadata.

11. The apparatus of claim 10, wherein: the at least one processing device is configured to transform the facial keypoints associated with the user's face for each of the multiple image frames in the driving video based on the merged metadata associated with the image frame.

12. The apparatus of claim 10, wherein, to generate the metadata, the at least one processing device is further configured to:

determine additional metadata describing a pose of the user's head and an expression deformation of the user's face in the source image; and transform the facial keypoints associated with the user's face based on the additional metadata to produce source facial keypoints, the source facial keypoints forming part of the metadata.

13. The apparatus of claim 9, wherein the trained machine learning model comprises one or more recurrent neural networks.

14. The apparatus of claim 13, wherein the one or more recurrent neural networks comprise at least one of:

a first gated recurrent unit (GRU)-based recurrent neural network trained to receive raw pitch, yaw, and roll angles and output refined pitch, yaw, and roll angles;

a second GRU-based recurrent neural network trained to receive raw translation deformations and output refined translation deformations; and a third GRU-based recurrent neural network trained to receive raw expression deformations and output refined expression deformations.

15. A non-transitory computer readable medium containing instructions that when executed cause at least one processor to:

obtain a source image of a user;

obtain a driving video in which a face or a head of the user is moving;

generate metadata identifying animations to be applied to the source image so that the source image mimics at least some movements of the user's face or head in the driving video, wherein the metadata comprises raw metadata determined from the driving video and refined metadata determined from the raw metadata, and wherein the raw metadata describes expression deformations of the user's face captured by the driving video; and initiate transmission of the source image and the metadata to an end user device configured to animate the source image based on the metadata;

wherein the instructions that when executed cause the at least one processor to generate the metadata comprise:

instructions that when executed cause the at least one processor to:

generate expression deformations for facial keypoints in each image frame of the driving video using an expression deformation function;

generate refined expression deformations for the facial keypoints using a refinement model based on the expression deformations;

identify primary facial keypoints from the facial keypoints:

replace the refined expression deformations related to the primary facial keypoints with the expression deformations generated by the expression deformation function related to the primary facial keypoints using a merge function to produce merged metadata; and suppress one or more artifacts associated with one or more objects that temporarily occlude at least a portion of the user's head or body in the driving video or that temporarily appear in the driving video by adjusting one or more subsequent sets of raw metadata associated with the driving video based on one or more previous sets of raw metadata associated with the driving video that do not contain noisy metadata immediately preceding the one or more subsequent sets of raw metadata; and wherein the instructions that when executed cause the at least one processor to suppress the artifacts associated with the one or more objects comprise:

instructions that when executed cause the at least one processor to replace a first portion of the refined metadata describing at least one of the expression deformations of the user's face with a second portion of the raw metadata describing the at least one of the expression deformations of the user's face.

16. The non-transitory computer readable medium of claim 15, wherein:

the instructions that when executed cause the at least one processor to generate the metadata further comprise:

instructions that when executed cause the at least one processor, for each of multiple image frames in the driving video, to determine the raw metadata, wherein, for each image frame, the raw metadata describes a pose of the user's head and the expression deformation of the user's face in the image frame, wherein the raw metadata associated with at least one image frame in the driving video includes noise from the one or more objects that temporarily occlude at least the portion of the user's head or body or that temporarily appear in the driving video; and the instructions when executed cause the at least one processor to provide the raw metadata to a trained machine learning model to generate the refined metadata, wherein the trained machine learning model is trained to suppress effects of the one or more objects that temporarily occlude at least the portion of the user's head or body or that temporarily appear in the driving video.

17. The non-transitory computer readable medium of claim 16, wherein the instructions that when executed cause the at least one processor to generate the metadata further comprise:

instructions that when executed cause the at least one processor to:

identify facial keypoints associated with the user's face in the source image; and for each of the multiple image frames in the driving video, transform the facial keypoints associated with the user's face based on the corresponding refined metadata to produce streaming facial keypoints, the streaming facial keypoints forming part of the metadata.

18. The non-transitory computer readable medium of claim 17, wherein: the instructions when executed cause the at least one processor to transform the facial keypoints associated with the user's face for each of the multiple image frames in the driving video based on the merged metadata associated with the image frame.

19. The non-transitory computer readable medium of claim 17, wherein the instructions that when executed cause the at least one processor to generate the metadata further comprise:

instructions that when executed cause the at least one processor to:

determine additional metadata describing a pose of the user's head and an expression deformation of the user's face in the source image; and transform the facial keypoints associated with the user's face based on the additional metadata to produce source facial keypoints, the source facial keypoints forming part of the metadata.

20. The non-transitory computer readable medium of claim 16, wherein the trained machine learning model comprises:

a first gated recurrent unit (GRU)-based recurrent neural network trained to receive raw pitch, yaw, and roll angles and output refined pitch, yaw, and roll angles;

a second GRU-based recurrent neural network trained to receive raw translation deformations and output refined translation deformations; and a third GRU-based recurrent neural network trained to receive raw expression deformations and output refined expression deformations.

\* \* \* \* \*